(12) United States Patent
Deering, Jr. et al.

(10) Patent No.: US 10,753,733 B2
(45) Date of Patent: Aug. 25, 2020

(54) LASER MEASUREMENT SYSTEM FOR A VEHICLE FRAME

(71) Applicant: Infinity Laser Measuring LLC, Apple Valley, MN (US)

(72) Inventors: Hartland W. Deering, Jr., Webster, MN (US); Darryl W. Koop, Marysville, WA (US)

(73) Assignee: Infinity Laser Measuring LLC, Apple Valley, MN (US)

( * ) Notice: Subject to any disclaimer, the term of this patent is extended or adjusted under 35 U.S.C. 154(b) by 480 days.

(21) Appl. No.: 15/455,812

(22) Filed: Mar. 10, 2017

(65) Prior Publication Data

US 2017/0299377 A1    Oct. 19, 2017

Related U.S. Application Data

(60) Provisional application No. 62/307,183, filed on Mar. 11, 2016.

(51) Int. Cl.
*G01B 11/25* (2006.01)
*G01B 11/275* (2006.01)
*G01S 7/35* (2006.01)

(52) U.S. Cl.
CPC .......... *G01B 11/25* (2013.01); *G01B 11/2755* (2013.01); *G01S 7/35* (2013.01)

(58) Field of Classification Search
CPC . G01B 11/25; G01B 11/2504; G01B 11/2518; G01B 11/2755; G01S 17/003; G01S 17/06; G01S 17/42; G01S 17/88; G01S 7/35; G01S 7/352; G01S 7/48; G01S 7/4804; G01S 7/481; G01S 7/4811; G01S 7/4817; G01S 7/4911; G01S 7/4912
See application file for complete search history.

(56) References Cited

U.S. PATENT DOCUMENTS

| | | | | |
|---|---|---|---|---|
| 4,302,104 A  * | 11/1981 | Hunter | ................... | G01B 5/255 33/288 |
| 5,596,190 A  * | 1/1997 | Li | .......................... | H04N 1/028 250/236 |
| 7,181,856 B1 * | 2/2007 | Hanchett | .............. | G01B 5/0025 33/288 |
| 2004/0130707 A1* | 7/2004 | Johnston | ................ | G01B 11/24 356/138 |
| 2011/0162221 A1* | 7/2011 | Knoke | ................... | G01B 11/03 33/228 |
| 2017/0208222 A1* | 7/2017 | Bousquet | .......... | H01L 27/14623 |

\* cited by examiner

*Primary Examiner* — Eric L Bolda
(74) *Attorney, Agent, or Firm* — Merchant & Gould P.C.

(57) ABSTRACT

A laser measurement system operates to identify locations of points of a vehicle in a three-dimensional space and determine whether the points of the vehicle are properly positioned. The laser measurement system includes a scanner device and a target device. The scanner device operates to generate a laser beam. The target device includes an optical detector configured to detect when the laser beam is directed at the target device and a position of the laser beam relative to the optical detector. The target device further includes a light control device configured to shape the laser beam directed to the optical detector of the target device.

19 Claims, 31 Drawing Sheets

LASER MEASUREMENT SYSTEM FOR A VEHICLE FRAME

CROSS REFERENCE TO RELATED APPLICATION

This application claims priority to U.S. Provisional Application Ser. No. 62/307,183, filed on Mar. 11, 2016, entitled LASER MEASUREMENT SYSTEM FOR VEHICLE FRAME, the disclosure of which is hereby incorporated by reference in its entirety.

BACKGROUND

The structural foundation of many common vehicle designs is a vehicle frame. The frame can be made of multiple frame members, often formed of metals such as steel. Additional vehicle components, such as the engine, body, power train, and interior, are ultimately connected to and supported by the frame. Some vehicles include a unibody design, in which the frame is integrated with the body. While the frame is typically designed to withstand large amounts of stress to form a strong structural foundation of a vehicle, some frames are also designed with intentional weaknesses. For example, automobile frames are commonly designed to include a crumple zone toward the front or rear of the vehicle. The crumple zone operates to deform during a collision to absorb some of the impact and thereby lessen the impact on passengers.

Due in part to the complex shapes of many vehicle frames, as well as to the wide variety of different vehicle frames, it can be difficult to determine whether a vehicle's frame has been bent from an original configuration. Such deformation can have adverse consequences, such as reducing the structural integrity of the vehicle or increasing wear on vehicle components. Once a vehicle frame has been deformed, it can in some cases be repaired by bending the frame back to the proper position or by replacing the damaged section. However, due to the wide variety of different vehicle frames, as well as the complex shape of most vehicle frames, it can be difficult to determine precisely what has been damaged, and the extent of that damage.

SUMMARY

In general terms, this disclosure is directed to a laser measurement system. In one possible configuration and by non-limiting example, the laser measurement system is configured to identify locations of points of a vehicle in a three-dimensional space and determine whether the points of the vehicle are properly positioned. Various aspects are described in this disclosure, which include, but are not limited to, the following aspects.

One aspect is a laser measurement system including a scanner device and a target device. The scanner device is configured to generate a laser beam. The target device includes an optical detector configured to detect when the laser beam is directed at the target device and a position of the laser beam relative to the optical detector, and a light control device configured to shape the laser beam directed to the optical detector of the target device.

Another aspect is a target device of a laser measurement system. The target device includes a housing and electrical circuitry protected by the housing. The electrical circuitry includes an optical detector that detects when a laser beam is directed at the target device and detects positions of the laser beam relative to the optical detector, and a light control device arranged over the optical detector and configured to shape the laser beam directed to the optical detector.

DETAILED DESCRIPTION

Figure 1:
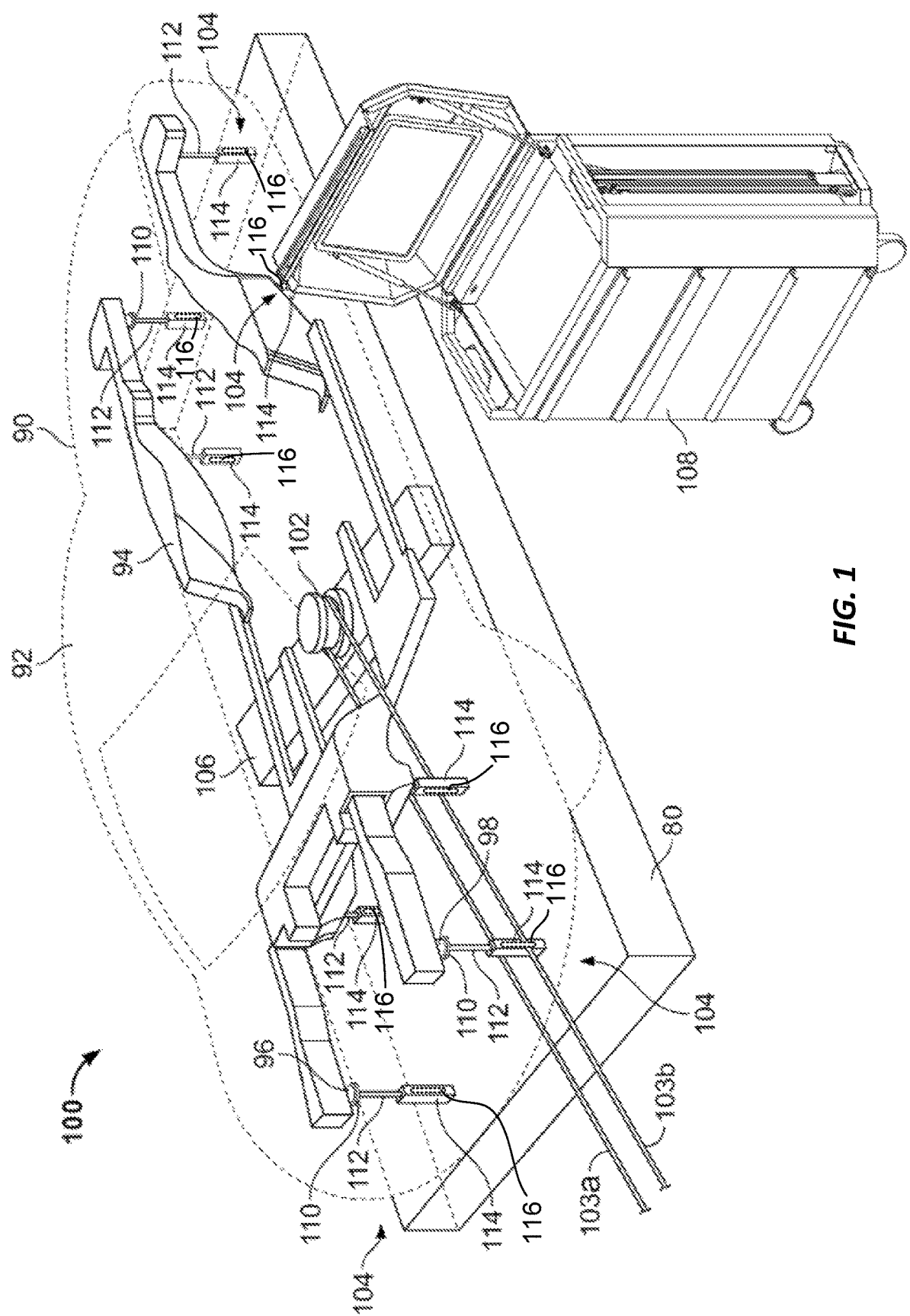
FIG. 1 is a schematic perspective view of an example measurement system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic perspective view of an example measurement system 100. The measurement system 100 is depicted in an exemplary environment including a vehicle lift system 80 and a vehicle 90. The vehicle 90 includes a body 92, a frame 94, and a plurality of frame points represented by points 96 and 98.

In some embodiments, the example measurement system 100 includes a scanner 102, one or more target assemblies 104, a bridge 106, and a cart 108. The target assemblies 104 include frame attachment devices 110, stems 112, target devices 114, and light control devices 116.

The measurement system 100 operates, in some embodiments, to measure the location of one or more points of the frame 94 of the vehicle 90, or other vehicle points. Examples of the points are points 96 and 98, shown in FIG. 1. If the vehicle 90 includes a unibody design, the frame 94 is the unibody.

The scanner 102 of the measurement system 100 operates to emit light, such as one or more laser beams 103a and 103b. At least a portion of the scanner 102 rotates about a central vertical axis, which in turn causes the laser beams 103a and 103b to rotate about that axis. The laser beams 103a and 103b thereby define one or more horizontal reference planes, from which distances to the frame points 96 and 98 can be computed.

The scanner 102 is typically arranged in a central region of the frame 94 between the front and rear ends of the frame 94 and between the left and right sides of the frame 94. The scanner 102 is also typically arranged below the frame 94, or below portions of the frame 94, such that parts of the frame 94 do not block the paths between the scanner 102 and the target devices 114. In some embodiments, the bridge 106 is placed on the top of part of the vehicle lift system 80, and provides a sturdy platform for supporting the scanner 102 in the central region of the frame 94.

The scanner 102 includes a light generator configured to generate laser beams 103a and 103b that are output from the scanner 102. The laser beams 103a and 103b rotate as the scanner 102 or a portion thereof rotates. One example of laser beams is a green laser beam.

The scanner 102 can include programmable electronics, such as one or more processors and sets of memory. Examples of such a processor include a central processing unit, a microprocessor, a microcontroller, a programmable logic device, a field programmable gate array, a digital signal processing device, a reduced instruction set computing device, a complex instruction set computing device, and an application-specific integrated circuit device. Memory is configured to store digital data including data computed by the processor or received through the communication circuitry. Memory is also configured to store data instructions, which when executed by the processor, cause the processor to execute one or more methods or operations as described herein. Examples of memory devices include flash memory, random access memory ("RAM"), read only memory ("ROM"), synchronous dynamic access memory ("SDRAM"), and other known forms of digital storage.

In some embodiments, the scanner 102 includes control circuitry having a processor and memory. Program instructions, such as in the form of software, can be stored in the memory and executed by the processor to perform one or more methods or operations, such as described herein. For example, in some embodiments, communications from the target devices is received through communication circuitry of the scanner 102 (as described below) and communicated to the control circuitry of the scanner 102. Data contained in the communications is then stored in memory of the control circuitry. In addition, in some embodiments, additional processing is performed on the data.

Some embodiments of the scanner 102 include communication circuitry configured to enable the scanner 102 to communication with the target devices 114 and/or a computing device (such as housed in the cart 108). In some embodiments, the communication circuitry permits direct communication between the scanner 102 and the target devices 114, and between the scanner 102 and the computing device of the cart 108. As one example, the communication circuitry includes a radio frequency transceiver configured to send and receive radio frequency signals. Other network communication protocols, such as Ethernet or a wireless communication protocol (e.g., the 802.11 communication protocols), can also be used for the communication circuitry.

The communication circuitry of the scanner 102 can include programmable electronics, such as one or more processors and sets of memory. Examples of such a processor include a central processing unit, a microprocessor, a microcontroller, a programmable logic device, a field programmable gate array, a digital signal processing device, a reduced instruction set computing device, a complex instruction set computing device, and an application-specific integrated circuit device. Memory is configured to store digital data including data computed by the processor or received through the communication circuitry. Memory is also configured to store data instructions, which when executed by the processor, cause the processor to execute one or more methods or operations as described herein. Examples of memory devices include flash memory, random access memory ("RAM"), read only memory ("ROM"), synchronous dynamic access memory ("SDRAM"), and other known forms of digital storage.

Some embodiments of the scanner 102 further include synchronization circuitry configured to detect rotation of the scanner 102 or a rotatable portion thereof. The synchronization circuitry is configured to monitor the rotation of at least a portion of the scanner 102 and to generate a synchronization signal that is communicated to the target devices 114. An example of the synchronization circuitry is further described below.

Referring still to FIG. 1, the target assemblies 104 are each connected to a point of interest of the frame 94, such as the points 96 and 98. In one example, the target assembly 104 includes the frame attachment device 110 that connects directly to the frame 94 such as using a magnet or by frictional engagement. In this example, the frame attachment device 110 is engaged with the point of interest (e.g., the point 96 or 98), such as a location of a particular bolt of the frame 94. Other examples of the point of interest (e.g., the point 96 or 98) are joints, corners, holes, surfaces, edges, or any other identifiable location of the frame 94.

The target assemblies 104 in the measurement system 100 are used in conjunction with the scanner 102 to provide height measurements along with time stamp data, which are obtained from the laser rotation and used to calculate the positions in, for example, the X and Y axes.

The stem 112 is a device that is configured to support the target device 114 in a spaced relationship to the frame attachment device 110. When assembled, the stem 112 is connected to the frame attachment device 110. The stem 112 has a length that is known or can be identified by the measurement system 100. An example of stem 112 is a rod.

The target device 114 operates to detect the laser beams 103a and 103b. The time and position of the laser beam is recorded when the target device 114 detects the laser beam. Subsequent calculations are then performed by the measurement system 100 using this data to compute the three-dimensional location of the target device 114 and the associated point of the frame 94.

The light control device 116 operates to control laser beams from the scanner 102, which are directed to the target device 114. The light control device 116 can improve performance of the target device 114 as a detector of laser beams from the scanner 102. In some embodiments, the light control device 116 is configured to spread out laser beams to be better detected by the target device 114. In addition or alternatively, the light control device 116 operates to provide a uniform light signal onto the target device 114, thereby improving accuracy in detection of light through the target device 114.

The cart 108 provides a storage location for various components of the measurement system 100 and also houses a computing device. In some embodiments, the computing device receives position data from the scanner 102 and/or the target devices 114 and includes software that generates one or more user interfaces.

FIGS. 2-6 illustrate an example method for operating the measurement system 100 to determine a position of the target device 114.

Figure 2:
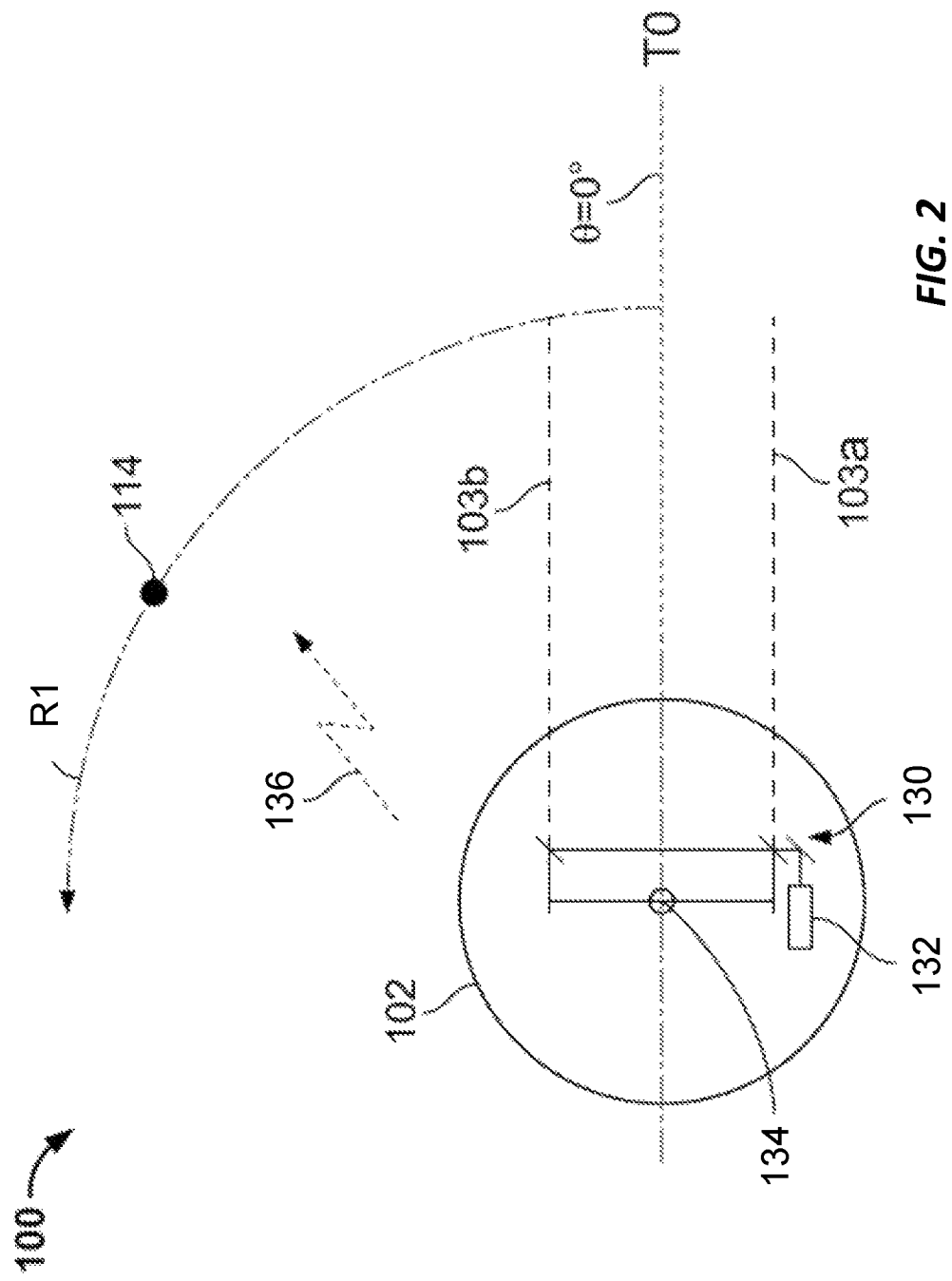
FIG. 2 is a schematic plan view of portions of the measurement system of FIG. 1.
Figure 8:
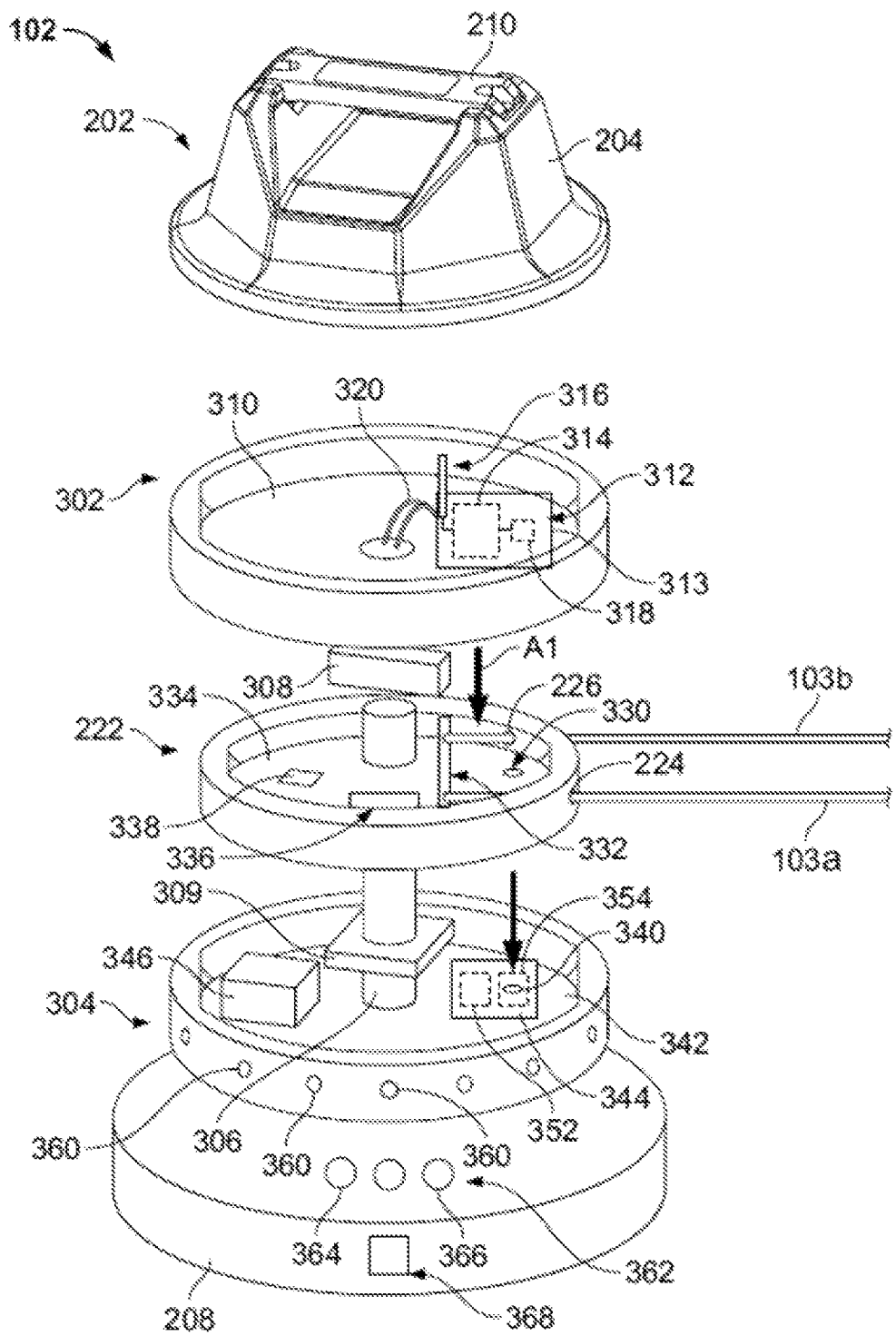
FIG. 8 is a schematic exploded block diagram illustrating an example of the scanner of FIG. 7.

FIG. 2 is a schematic plan view of portions of the measurement system 100 of FIG. 1. The scanner 102 of the measurement system 100 includes an optics assembly 130 and at least one laser 132. The outputs of the optics assembly 130 are the laser beams 103a and 103b. At least part of the scanner 102 rotates in the direction of rotation R1 about a vertical axis of rotation 134. The scanner 102 includes a home position where an angle of rotation θ=0°. 2 (FIG. 8) (FIG. 8). When in the home position, the scanner 102 generates a synchronization signal 136. The synchronization signal 136 is detected by the target device 114, which records a time T0 from an internal clock at which the synchronization signal 136 is received. An example of the internal clock is a 32 bit counter with a clock speed of 10 ns (100 MHz). Another example of the internal clock is a counter with a clock speed of 50 ns (20 MHz). Other embodiments include other counters or other clock speeds.

Figure 3:
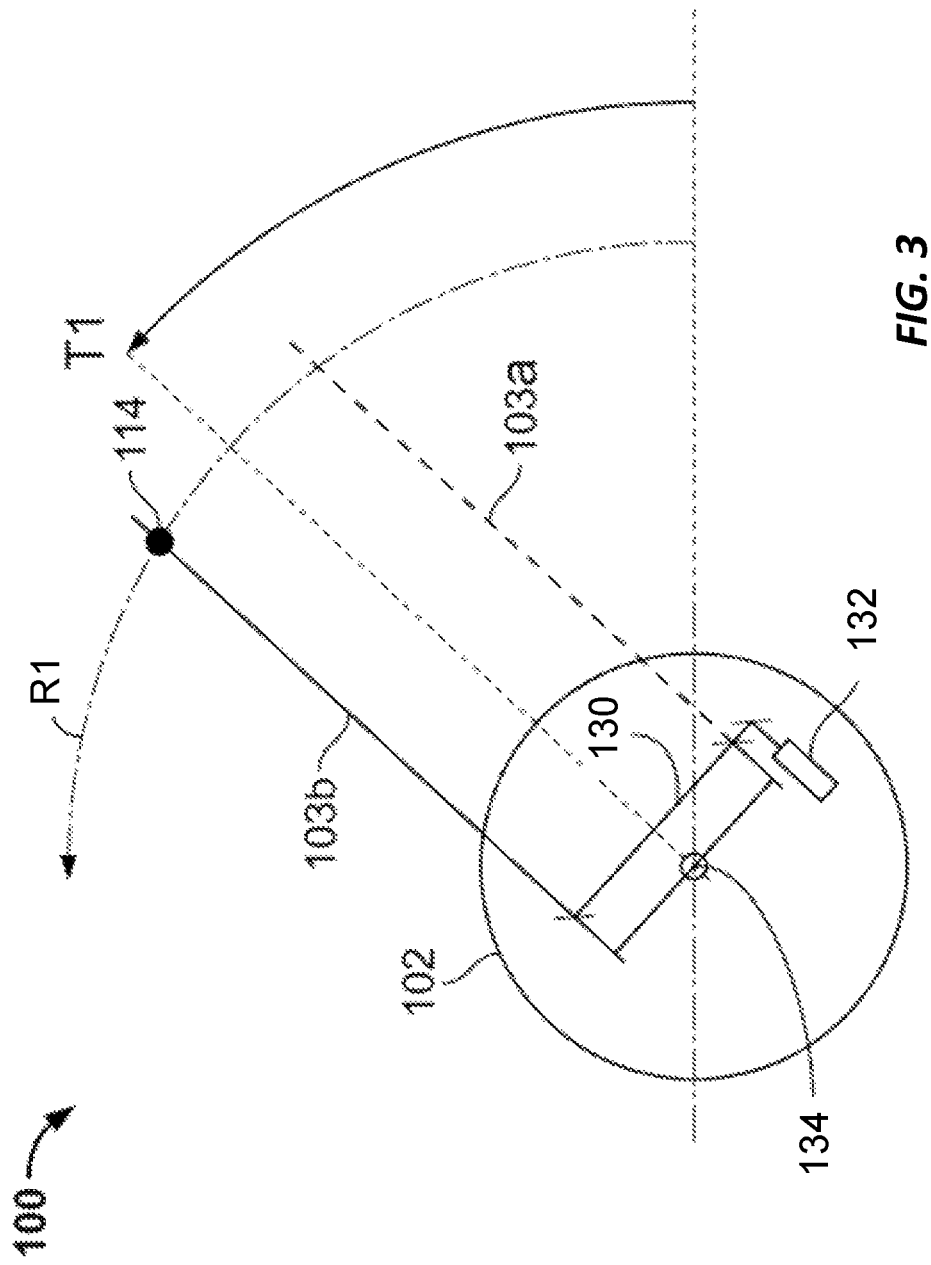
FIG. 3 is a schematic plan view of portions of the measurement system shown in FIG. 1, showing a scanner at time T1.

Referring now to FIG. 3, the scanner 102 continues to rotate about the vertical axis of rotation 134. At some point, the laser beam 103b comes into contact with the target device 114. An optical detector (such as an optical detector 608 in FIG. 13) of the target device 114 detects the laser beam 103b and the target device 114 records in memory a time T1 from an internal clock at which the laser beam 103b is detected. In some embodiments, the target device 114 records both times when the leading and trailing edge of the laser beam 103b are detected, and averages them together to obtain time T1 at which the laser beam 103b is at the center of the optical detector of the target device 114.

Figure 4:
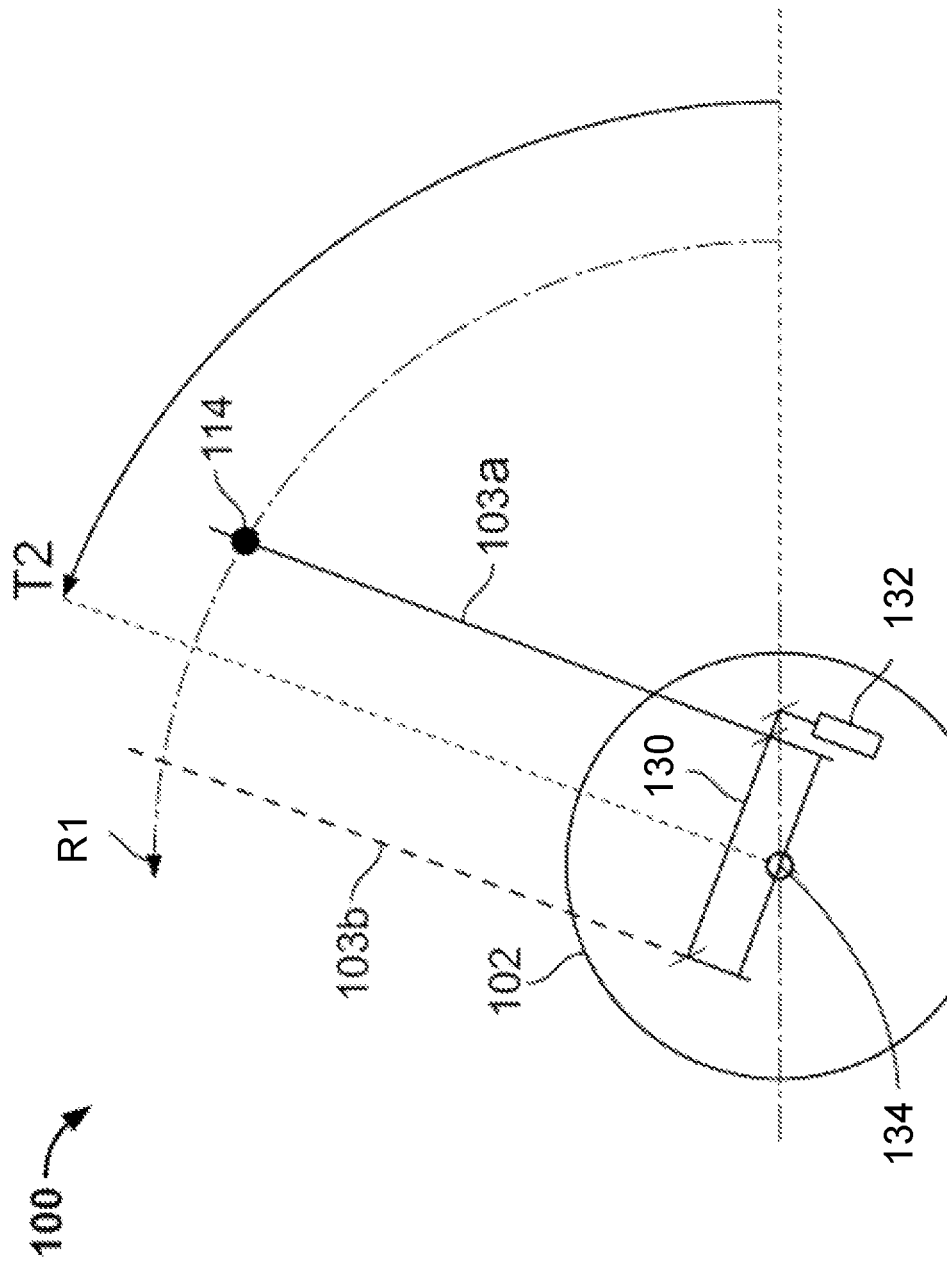
FIG. 4 is a schematic plan view of portions of the measurement system shown in FIG. 1, showing the scanner at time T2.

Referring now to FIG. 4, the scanner 102 continues to rotate about the vertical axis of rotation 134. Shortly after time T1, the laser beam 103a comes into contact with the target device 114. The optical detector of the target device 114 detects the laser beam 103a and the target device 114 records in memory a time T2 from an internal clock at which the laser beam 103b is detected. In some embodiments, T2 is the average time of the detected leading and trailing edges of the laser beam 103a.

Figure 5:
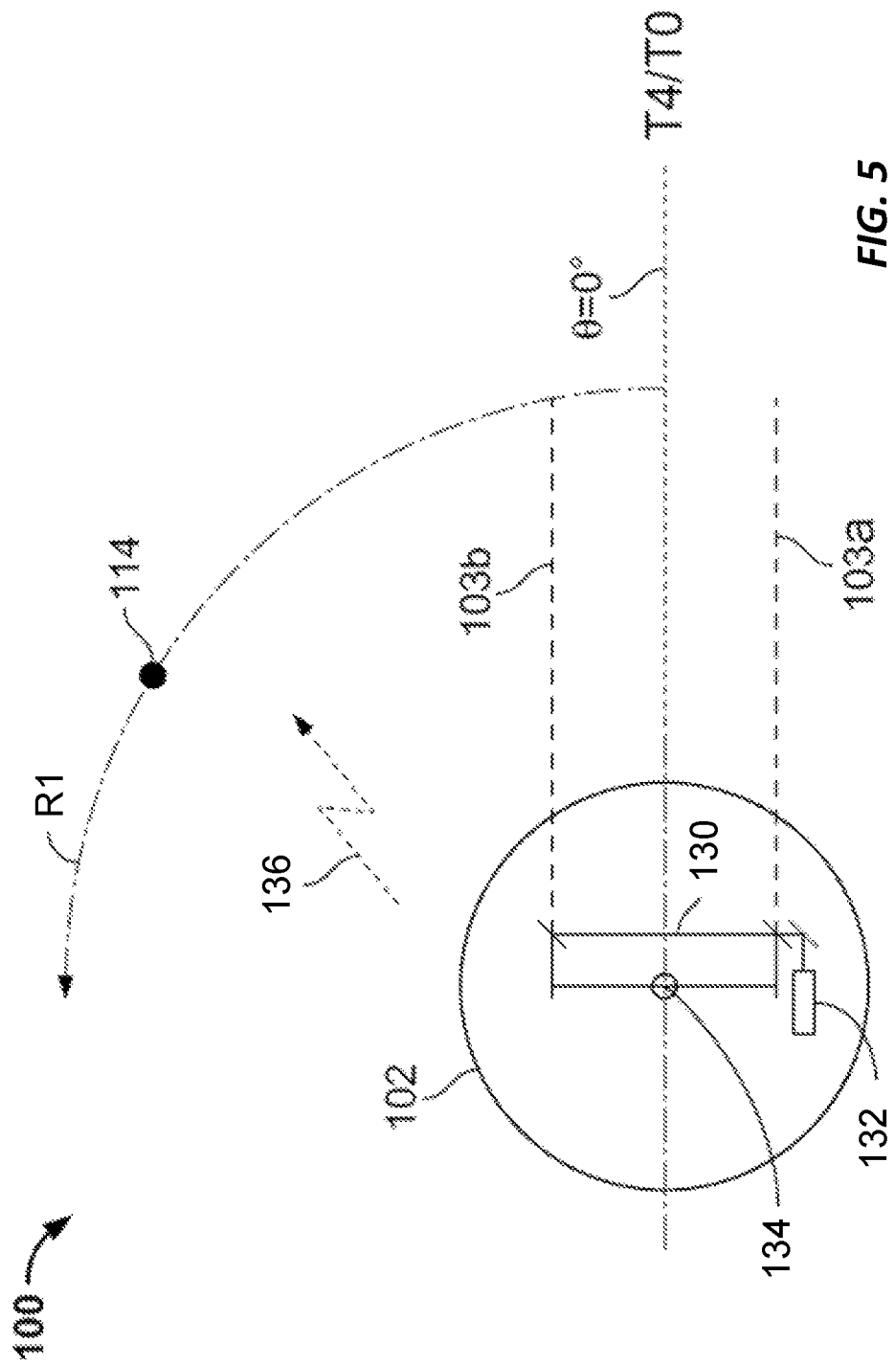
FIG. 5 is a schematic plan view of portions of the measurement system shown in FIG. 1, showing the scanner back at a home position.

Referring now to FIG. 5, the scanner 102 continues to rotate about the vertical axis of rotation 134. Once the scanner 102 has completed a full rotation, it returns to the home position. At this time, the scanner 102 transmits another synchronization signal 136, which is detected by the target device 114. The target device 114 records the time T4 in memory. This time is also used as T0 for the next scan.

Figure 6:
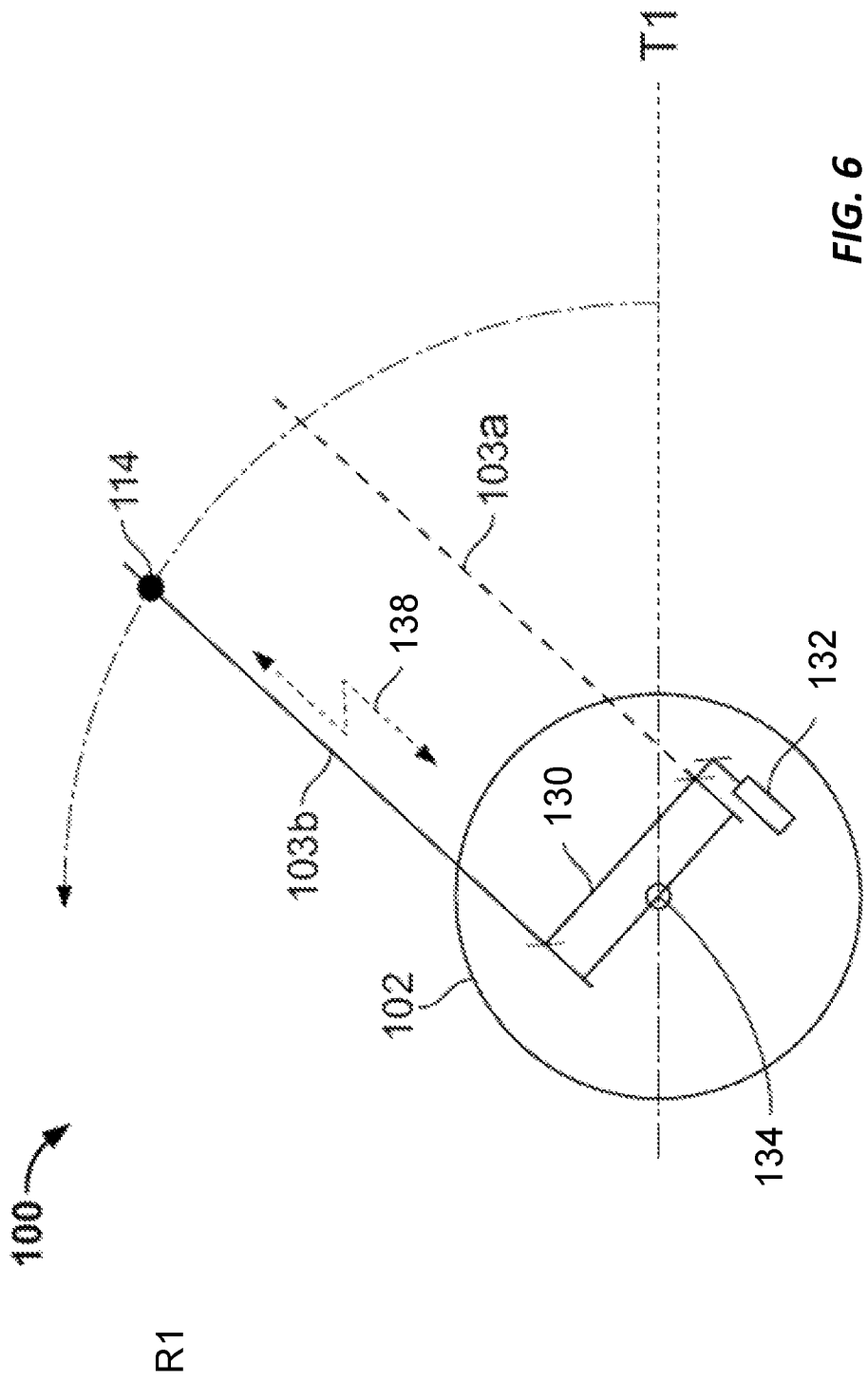
FIG. 6 is a schematic plan view of portions of the measurement system shown in FIG. 1, showing communication of data between a target device and the scanner.

Referring now to FIG. 6, the scanner 102 continues to rotate about the vertical axis of rotation 134. While the scanner 102 is rotating, the target device 114 operates to process data and prepare it for transmission to the scanner 102. For example, in some embodiments, times T0, T1, T2, and T4 are modified by subtracting T0 to obtain a value of the time that elapsed from time T0.

In some embodiments, in order to reduce the chance that multiple target devices 114 will attempt to communicate with the scanner 102 at the same time, the target devices 114 package a message together but wait to send the message until a predetermined transmit time. As one example, the target device 114 waits to transmit the message back to scanner 102 until the next time T1, when the laser beam 103b is detected.

A message 138 is then transmitted from the target device 114 to the scanner 102, such as using a communication device (e.g., a communication device 808 in FIG. 15) of the target device 114 and communication circuitry of the scanner 102.

An example of the data transmitted in message 138 includes one or more of the following. The period, or total time of one rotation of the scanner 102 (T4); the times T1 and T2 at which laser beams 103b and 103a were detected; the heights H1 and H2 of each laser beam 103b and 103a along the optical detector (e.g., the optical detector 608) of the target device or any other desired data. In some embodiments, if the scanner 102 has data to send to the target device 114, the data can be transmitted from the scanner 102 to the target device 114 during this communication. For example, the scanner 102 can send status information, alignment information, or other information to the target device 114. In some embodiments, the scanner 102 sends data to the target device 114 after receiving the data from the computing device of the cart 108. An example of alignment data is data that indicates whether the associated position is properly aligned or is out of alignment, and can include height, width, and length related data. This data is used by the target device 114 to properly illuminate position indicators (e.g., 630, 632, and 634 shown in FIG. 13) to visually indicate whether the associated point is currently out of position, and the relative extent of the error.

Figure 13:
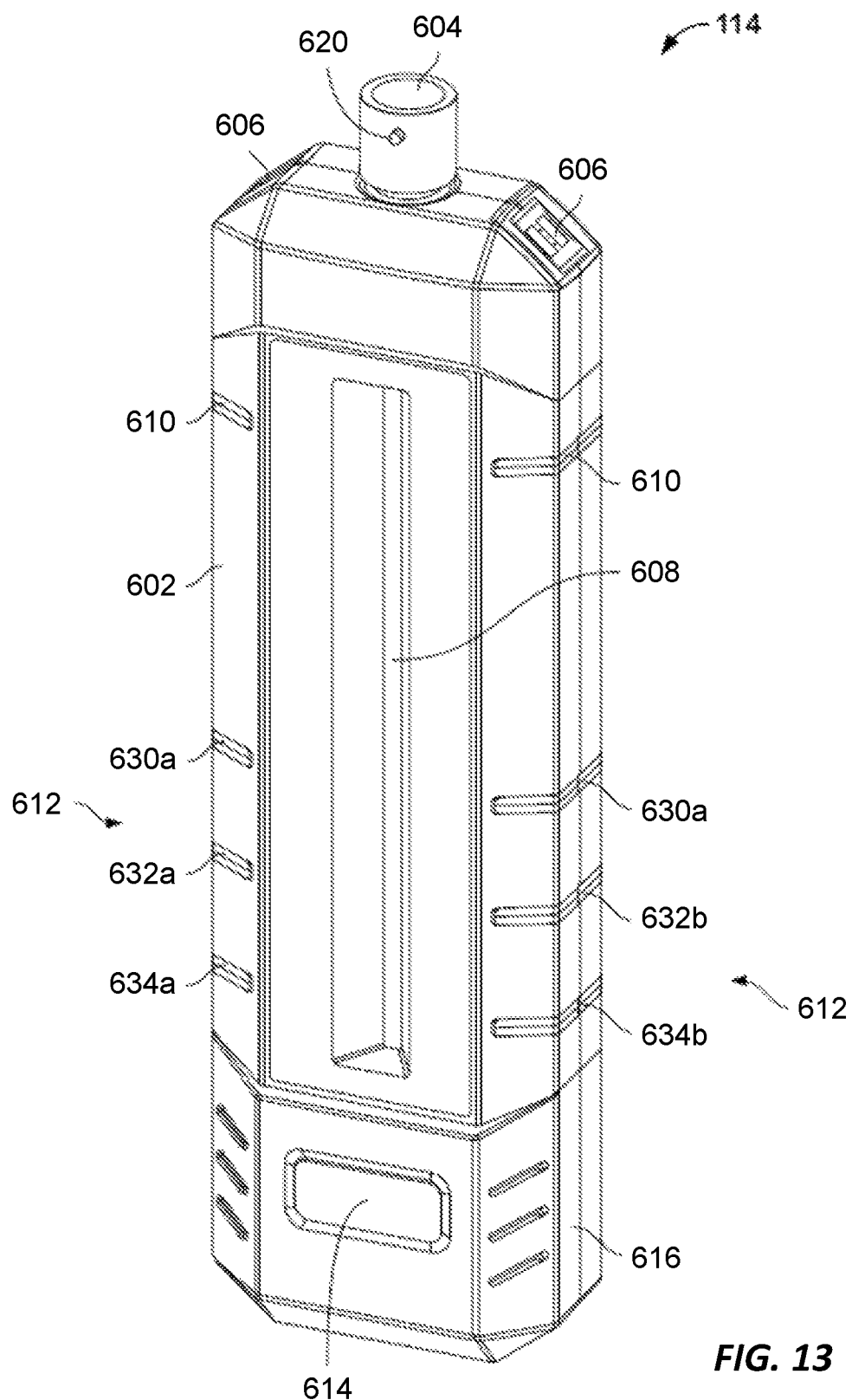
FIG. 13 is a front perspective view of an example of the target device.

In some embodiments, height values H1 and H2 are computed as a distance from a center point of the optical detector 608 (FIG. 13). In some embodiments a laser beam detected below the center point is given a positive value and a laser beam detected above the center point is given a negative value. This is done in some embodiments because raising of the frame would cause the laser beam 103 to strike lower on the optical detector 608, while lowering the frame would cause the laser beam 103 to strike higher on the optical detector 608.

In some embodiments, the heights H1 and H2 are further adjusted based on a known length of an attached stem. For example, if a target device 114 detects a stem is attached, the target device 114 determines which stem is connected to it (such as by checking a resistance of the resistor). A lookup table contained in memory of the target device 114 is then used to identify the length of that stem. Alternatively, the lookup table is stored in the scanner or on the computing device of the cart 108. The length is then used to adjust height H1 and H2 to represent the height of a point on the frame relative to the laser beams 103b and 103a.

As data from each of the target devices 114 is returned to the scanner 102, the scanner performs further processing on the data. For example, in some embodiments, the scanner 102 utilizes data from the target devices 114 to determine three-dimensional points associated with the frame of the vehicle. In some embodiments the points are computed in x, y, and z coordinates. The three-dimensional points are then sent, in some embodiments, to a computing device, such as the computing device within the cart 108. The computing device can then utilize these points to perform various measurements between the points. The measurements are compared to known data about the respective frame 94 to determine whether one or more points are not in their expected locations. If so, a message can be communicated back to the target devices (either directly or via the scanner 102) to cause the target devices to display the appropriate position codes using the position indicators 612.

In other embodiments, the processes performed in the scanner 102 as described above, or other operations involving the scanner 102, are instead executed by other computing devices, such as a computing device in one or more associated target devices 114 and/or a computing device in the cart 108. In such configurations, the target devices 114 can directly communicate with the cart 108 without involving the scanner 102.

Figure 7:
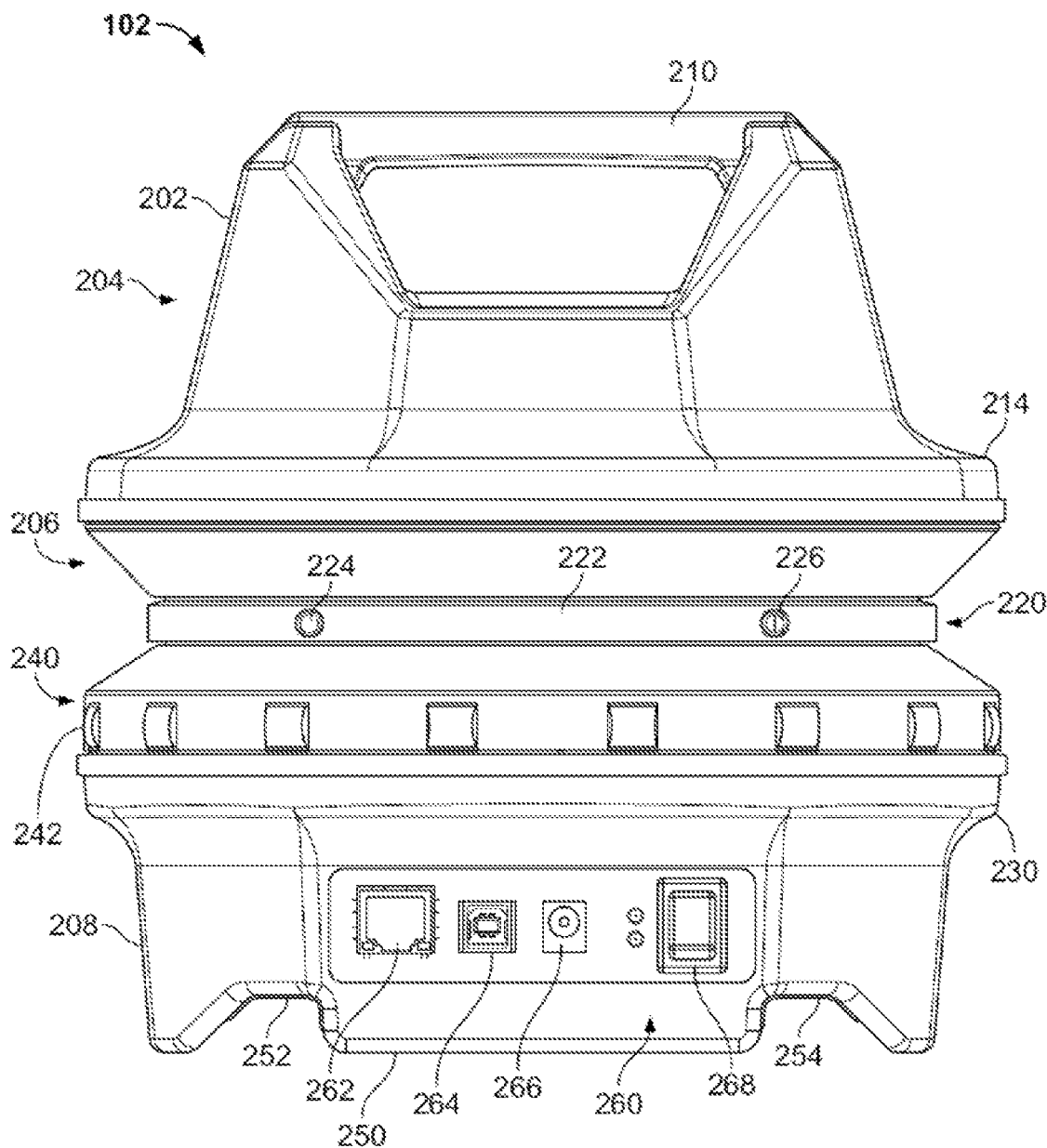
FIG. 7 is a side view of an example scanner.

FIG. 7 is a side view of an example scanner 102. In this example, the scanner 102 includes a housing 202 including an upper portion 204, a central portion 206, and a lower portion 208.

The housing 202 forms a protective enclosure for various scanner components contained therein. The upper portion 204 of housing 202 includes a handle 210, in some embodiments, which permits a user to easily grasp and transport the scanner 102. In some embodiments, the upper portion 204 houses communication circuitry that sends and/or receives electromagnetic signals, such as radio frequency waves. Accordingly, in some embodiments, the upper portion 204 is made of a material that does not significantly interfere with sending and/or reception of such signals, such as a non-metallic material. An example of a suitable material is a polymer, such as a plastic material. Other materials or combinations of materials are used in other embodiments.

The central portion 206 includes a recessed region 220 that is recessed from the lower periphery 214 of the upper portion 204 and from an upper periphery 230 of the lower portion 208. A rotating section 222 of the scanner 102 is located within the recessed region 220. The rotating section 222 is protected from inadvertent contact with other objects by being located within the recessed region 220. For example, if an object, such as a hand, comes into contact with a side of the scanner 102, the protruding upper and lower periphery 214 and 230 will tend to come into contact with the object to stop the object from contacting the recessed rotating section 222.

In some embodiments, the rotating section 222 includes an optics assembly (shown in FIG. 8) that generates one or more light beams. Apertures 224 and 226 are provided in the rotating section 222 to permit the one or more light beams to pass therethrough. In some embodiments, the outer part of rotating section 222 forms a flywheel, which contains the apertures 224 and 226.

The lower portion 208 of the housing 202 encloses a bottom portion of the scanner 102. In some embodiments, a synchronization assembly 240 is contained within the lower portion 208, and includes lenses 242 through which a synchronization signal is transmitted. An example of a synchronization signal is an infrared light pulse (or set of pulses).

The lower portion 208 also includes a profiled bottom surface 250 in some embodiments. The profiled bottom surface 250 includes recesses 252 and 254. The recesses 252 and 254 aid in proper alignment of the scanner 102 by engaging with rails of the bridge 106. When the bridge 106 is arranged transverse to the lift system 80, the recesses 252 and 254 engage with the bridge 106 when the recesses 252 and 254 are arranged parallel with rails of the bridge 106. The engagement of the recesses 252 and 254 with rails of the bridge 106 reduces potential movement or rotation of the scanner 102 with respect to the bridge 106, such as due to the rotation of the rotating section 222 or any vibration generated by the scanner 102.

Some embodiments of the scanner 102 include a connection panel 260 for electrically connecting the scanner 102 with another device. In this example, the connection panel 260 includes an Ethernet port 262, universal serial bus port 264, and a power adapter port 266. The scanner 102 also includes a power switch 268 that allows an operator to turn on and turn off the scanner 102.

FIG. 8 is a schematic exploded block diagram illustrating an example of the scanner 102. In addition to the housing 202 (including the upper portion 204 and the lower portion 208) and the rotating section 222, the scanner 102 includes an upper section 302, a lower section 304, and a central shaft 306. Additional components are also included in each section, as discussed below.

The upper portion 204 of the housing 202 forms a cover for the scanner 102 in some embodiments, while the lower portion 208 of the housing 202 forms a base for the scanner 102. One or more bearing assemblies 308 and 309 are used in some embodiments as an interface between the stationary upper and lower sections 302 and 304 and the rotating section 222. The bearing assemblies 308 and 309 include one or more bearings, such as a sliding bearing (such as a bushing or plain bearing), rolling-element bearing (such as a ball bearing or pin bearing), fluid bearings, or other bearings.

In this example, the scanner 102 includes a multi-tiered design including multiple different sections that form different interior levels of the scanner 102. In this example, the scanner 102 includes three different sections, including the upper section 302, the rotating section 222, and the lower section 304. The central shaft 306 extends through each of the sections 302, 222, and 304 and supports each section with respect to the other sections. In some embodiments, the shaft 306 is hollow and provides a conduit for electrical wires that extend between the upper section 302 and the lower section 304 that protects the electrical wires against wear or other damage that could otherwise occur if the wires were to come into contact with the rotating section 222.

In this example, the upper section 302 and the lower section 304 remain stationary during operation, while the rotating section 222 is caused to rotate about the shaft 306, the operation of which is discussed in more detail below.

The upper section 302 typically includes a base 310 that is rigidly supported and connected to the shaft 306 to prevent rotation of the upper section 302 and to support the section 302 in a spaced relationship to the rotating section 222 and the lower section 304. The base 310 supports additional components of the upper section 302 in some embodiments, such as electronic circuitry 312. The electronic circuitry 312 is arranged above, below, or both above and below the base 310 in various possible embodiments.

In some embodiments, the electronic circuitry 312 includes communication circuitry 314 and synchronization circuitry 318. In some embodiments, the communication circuitry 314 and/or the synchronization circuitry 318 include one or more printed circuit boards 313.

The communication circuitry 314 includes one or more electronic circuits that allow the scanner 102 to communicate with the target devices 114 and/or a computing device (such as housed in the cart 108), as shown in FIG. 1. In some embodiments, the communication circuitry 314 permits direct communication between the scanner 102 and the target devices 114, and between the scanner 102 and the computing device of the cart 108. As one example, the communication circuitry 314 includes a radio frequency transceiver configured to send and receive radio frequency signals. An example of a suitable RF transceiver is the MRF24J40MA 2.4 GHz RF Transceiver module distributed by Microchip Technology Inc. having a corporate office in Chandler, Ariz. Other embodiments include other communication circuitry.

In some embodiments, the communication circuitry 314 also includes programmable electronics, such as a processor and memory. An example of a suitable processor is the dsPIC30F5011 high-performance, 16-bit digital signal controller distributed by Microchip Technology Inc. Another example of a suitable processor is the PIC32MX320F128H 32-bit microcontroller also distributed by Microchip Technology Inc. Other examples of programmable electronics include a central processing unit, a microprocessor, a microcontroller, a programmable logic device, a field programmable gate array, a digital signal processing device, a reduced instruction set computing device, a complex instruction set computing device, and an application-specific integrated circuit device. Memory is configured to store digital data including data computed by the processor or received through the communication circuitry. Memory is also configured to store data instructions, which when executed by the processor, cause the processor to execute one or more methods or operations as described herein. Examples of memory devices include flash memory, random access memory ("RAM"), read only memory ("ROM"), synchronous dynamic access memory ("SDRAM"), and other known forms of digital storage.

In some embodiments, the communication circuitry 314 also includes an antenna 316 for transforming electrical signals into electromagnetic signals, as well as for transforming electromagnetic signals into electrical signals.

The synchronization circuitry 318 is used by the scanner 102 to detect rotation of the rotating section 222. In some possible embodiments, the synchronization circuitry 318 includes a synchronization light generator, such as a light emitting diode (LED). The LED is positioned above an aperture formed through the base 310 to permit light to pass therethrough. Alternatively, in another embodiment, the LED is positioned below the base 310. Light generated by the synchronization circuitry 318 shines toward the rotating section 222 in the direction of arrow A1. As the rotating section 222 rotates, a sync aperture 330 formed through the rotating section 222 periodically becomes aligned with the LED, allowing light to pass therethrough. The light is then detected by an optical detector 340 located at the lower section 304. This allows the scanner 102 to monitor the rotation of the rotating section 222 and to identify each time a full rotation is made.

In another possible embodiment, the synchronization LED is included as part of a power supply 338, which can be positioned above or within the aperture 330. Light generated from the LED is then detected by the optical detector 340 once per rotation.

As noted above, the bearing assembly 308 is provided in some embodiments between the upper section 302 and the rotating section 222 to maintain a desired spacing between the upper section 302 and the rotating section 222 and to prevent undesired contact between the sections. The bearing assembly 308 includes a hollow center so as to not interfere with the shaft 306 that extends therethrough.

As illustrated, the rotating section 222 is arranged between the upper section 302 and the lower section 304 and typically includes an optics assembly 332, a base 334, and a power supply 338. In this example, the optics assembly 332 includes a light generator in the form of a laser 336. In some embodiments, the optics assembly 130 (FIGS. 2-6) is configured as, or includes, the optics assembly 332, and the laser 132 (FIGS. 2-6) is configured as, or includes, the laser 336. The optics assembly 332 generates one or more laser beams 103a and 103b that are output from the scanner 102 through the apertures 224 and 226. The laser beams 103a and 103b rotate as the rotating section 222 rotates.

One example of the laser 336 generates a green laser beam. One example of a suitable laser 336 is the industrial laser module manufactured by Diode Laser Concepts, Inc. of Central Point, Oreg. under Part No. 5K12B2-0010. The color of the green laser can be expressed in terms of the primary wavelength of light produced by the laser 336. In some embodiments the wavelength is in a range from about 492 nanometers to about 577 nanometers. In another embodiment, the wavelength is in a range from about 520 nanometers to about 565 nanometers. In another possible embodiment, the wavelength is in a range from about 525 nanometers to about 540 nanometers. In another possible embodiment, the wavelength is about 532 nm. Other embodiments, however, generate light having wavelengths outside of these ranges. For example, another possible embodiment generates a red laser beam. Yet another possible embodiment includes an ultra-violet laser either in place of, or in addition to the laser 336. As one example, light from the ultra-violet laser has a wavelength in a range from 10 nanometers to 400 nanometers.

Green light is close to the center of the visible spectrum, which makes the light more easily detectable to the human eye. In addition, green light can be separated from infrared light, using filters, to distinguish the laser beam from the infrared light pulse used for synchronization at the targets.

In some embodiments, the laser 336 is a continuous wave laser, in which the output of the laser is substantially constant over time. In another possible embodiment, however, a pulsed mode laser is used. In one embodiment, the pulsed mode laser pulses at a high frequency, such as greater than about 100 kHz, or greater than about 175 kHz, or greater than about 250 kHz, or greater than about 350 kHz, or greater than about 700 kHz. In some embodiments where high frequency pulsing is used, the frequency should be great enough that one or more pulses will fall within the detectable range of each target. In another possible embodiment a low frequency pulse is used. For example, in some embodiments each pulse is approximately equal to or less than the duration of a complete rotation of the rotating section 222. For example, if the rotating section 222 operates complete a full rotation in about 250 milliseconds, a low frequency pulse may have a pulse time of less than or equal to about 250 milliseconds.

The power supply 338 is provided to supply power to the laser 336. Due to the rotation of the rotating section 222, a standard wire is typically not used to supply power from the upper and/or lower sections 302 and 304. Instead, in some embodiments, power is delivered to the rotating section 222 with a rotational power delivery device, such as a rotary transformer. In some embodiments, the bearing assembly 308 is a combination bearing and rotary transformer.

An example of a rotary transformer includes two portions. A first portion is a stationary portion that is connected to the upper section 302 or the lower section 304 and receives power from the corresponding electrical circuitry. Some embodiments provide an AC drive signal to the first portion. The second portion is a rotary portion that is connected to the rotating section 222. The first portion and the second portion are maintained in close proximity to each other (such as within a few thousandths of an inch). Each of the first and second portions contain doughnut-shaped pot cores and corresponding coils. As the second portion rotates with the rotating section 222, electricity is generated within the coils from the magnetic field generated from the first portion. The electricity is then delivered to the power supply 338.

Other embodiments include other rotational power delivery devices, such as a brush and ring connection, a slip ring device, or a rotating electrical connector.

In some embodiments, additional power supply circuitry is provided by the power supply 338, which receives power from the rotary transformer. Examples of the power supply circuitry include a fuse, a filter (such as including one or more capacitors or inductors), a linear regulator, or other power supply circuitry.

The lower section 304 is arranged below the rotating section 222 in some embodiments. As discussed above, the bearing assembly 309 is used at the interface between the rotating section 222 and the lower section 304. The bearing assembly 309 supports the rotating section 222 with respect to the lower section 304 and permits the rotating section 222 to rotate about the shaft 306.

In some embodiments, the lower section 304 includes a base 342, electronic circuitry 344, and a motor 346. The electronic circuitry 344 and the motor 346 are connected to and supported by the base 342 in some embodiments.

The electronic circuitry 344 typically includes programmable electronics, such as a processor and memory. Additional examples of programmable electronics are discussed herein. In this example, the electronic circuitry includes control circuitry 352 and synchronization circuitry 354. In some embodiments, the control circuitry includes a processor and memory. Program instructions, such as in the form of software, can be stored in the memory and executed by the processor to perform one or more methods or operations, such as described herein. For example, in some embodiments communications from targets is received through the communication circuitry 314 and communicated to the control circuitry 352, such as via one or more wires 320 connected between the electronic circuitry 312 and the electronic circuitry 344. Data contained in the communications is then stored in memory of the control circuitry 352. In addition, in some embodiments, additional processing is performed on the data. Examples of such communications and data processing operations are discussed in more detail herein.

Some embodiments of the control circuitry 352 further include communication circuitry, such as configured to communicate via a network communication protocol, such as Ethernet or a wireless communication protocol, such as one of the 802.11 family of communication protocols.

Some embodiments of the control circuitry 352 include motor control circuitry. In another possible embodiment, separate motor control circuitry is provided. The motor control circuitry controls the operation of the motor 346, which is coupled to the rotating section 222 to cause rotating section to rotate relative to stationary components of the scanner 102 (such as the lower section 304).

The motor 346 includes a transmission assembly that delivers power from the motor 346 to the rotating section 222. An example of a transmission assembly is a belt that is connected to a belt guide coupled to the rotating section 222. Other embodiments include other transmission assemblies, such as a chain, gear assembly, frictional wheel, or other transmission assemblies.

A gear module is included in some embodiments to transform power from the motor 346 to the desired form and/or to deliver the power to the desired location. For example, the gear module can be used to convert the motors rotational speed (e.g., rotations per minute) to a desired rotational speed for the rotating section 222. As another example, the gear module can be used to increase (or decrease) the torque applied to the rotating section 222.

As described above, some embodiments of the electronic circuitry 344 further include synchronization circuitry 354, which operates with the synchronization circuitry 318 to monitor rotation of the rotating section 222 and to generate a synchronization signal that is communicated to the target devices 114. In one example, the synchronization circuitry 354 is located vertically below the synchronization light generator (such as an LED) of synchronization circuitry 318. As the rotating section 222 rotates, light from the light generator periodically becomes aligned with the sync aperture 330 and a light detector of the synchronization circuitry 354. This occurs, for example, once per rotation if the rotating section 222 includes one aperture. Additional apertures are provided in some embodiments. When the light detector, such as a photo diode, receives light from the light generator, the light is converted into electricity that is detected by the synchronization circuitry 354. At that time, synchronization circuitry generates a synchronization signal using one or more synchronization signal generators 360 that communicate the synchronization signal to the target devices 114.

In some embodiments, such synchronization signal generators are light-emitting diodes that generate electromagnetic radiation having frequencies within (or substantially within) the infrared light spectrum. The infrared light spectrum includes, for example, electromagnetic radiation having a wavelength between 0.7 and 300 micrometers. In one example embodiment, the synchronization signal has a wavelength of about 940 nm. Other embodiments generate electromagnetic radiation having other wavelengths. Some embodiments use other synchronization signal generators, such as a radio-frequency communication device, or a visible light generator. Yet other embodiments communicate synchronization events using wired communications.

In some embodiments, the scanner 102 further includes a control panel 362, such as provided at the lower portion 208. The control panel 362 includes one or more output devices 364 and/or one or more input devices 366. Examples of the output devices 364 include status indicators, such as a power status light, communication status indicators (such as a send light and a receive light), and a laser status light. Examples of the input devices 366 include switches (or buttons), other controls, and data communication ports. An example of a switch is a power on/off switch for turning on or off the scanner 102. Another example of a switch is a laser on/off switch. An example of a data communication port is an Ethernet communication port for data communication between scanner and a computing device (such as within the cart 108). Such communication can be either direct communication or network communication. In some embodiments, the Ethernet communication port provides power to the scanner 102. An example of a suitable Ethernet communication port is a Power Over Ethernet (POE) compatible port. Some embodiments include target data communication ports. Another example of a data communication port is a USB port. The USB port can be used, for example, for data communication between the scanner 102 and another device (i.e., a computing device, a target, or another external device), or for plugging in a memory card (such as a USB memory stick). The memory card can then be used by the scanner 102 to store data, or to retrieve data, such as a software update. In another possible embodiment, the USB port is a 'B' port and is not used to receive a USB memory stick in some embodiments. In some embodiments the USB port is used to configure and diagnose the system.

Some embodiments of the scanner 102 further include one or more ports 368. An example of a port 368 is a power jack, such as for receiving power from a power adapter, AC power cable, or DC power cable. Some embodiments of the electronic circuitry 344 include power supply circuitry, such as for filtering or otherwise transforming power received from port 368. In other embodiments, a power cord is provided instead of (or in addition to) port 368. Other ports are used in some embodiments.

Figure 9:
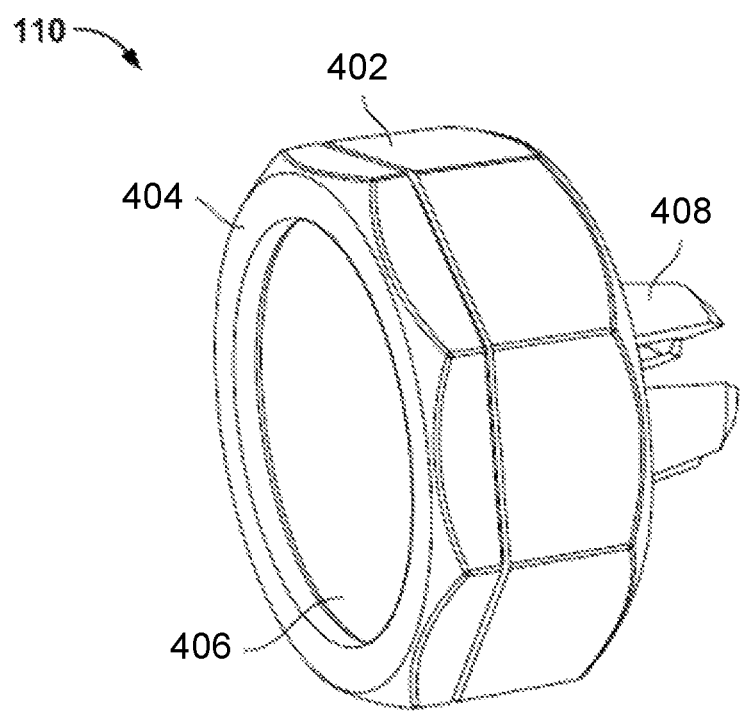
FIG. 9 is a perspective view of an example attachment device.
Figure 10:
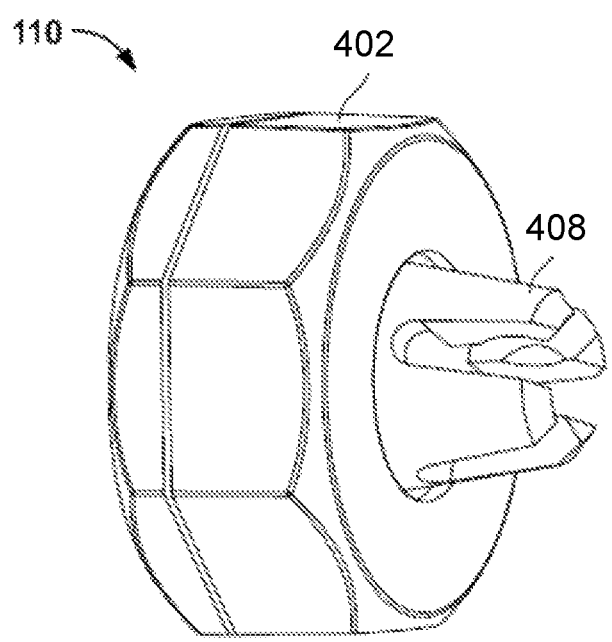
FIG. 10 is another perspective view of the example attachment device, shown in FIG. 9.
Figure 11:
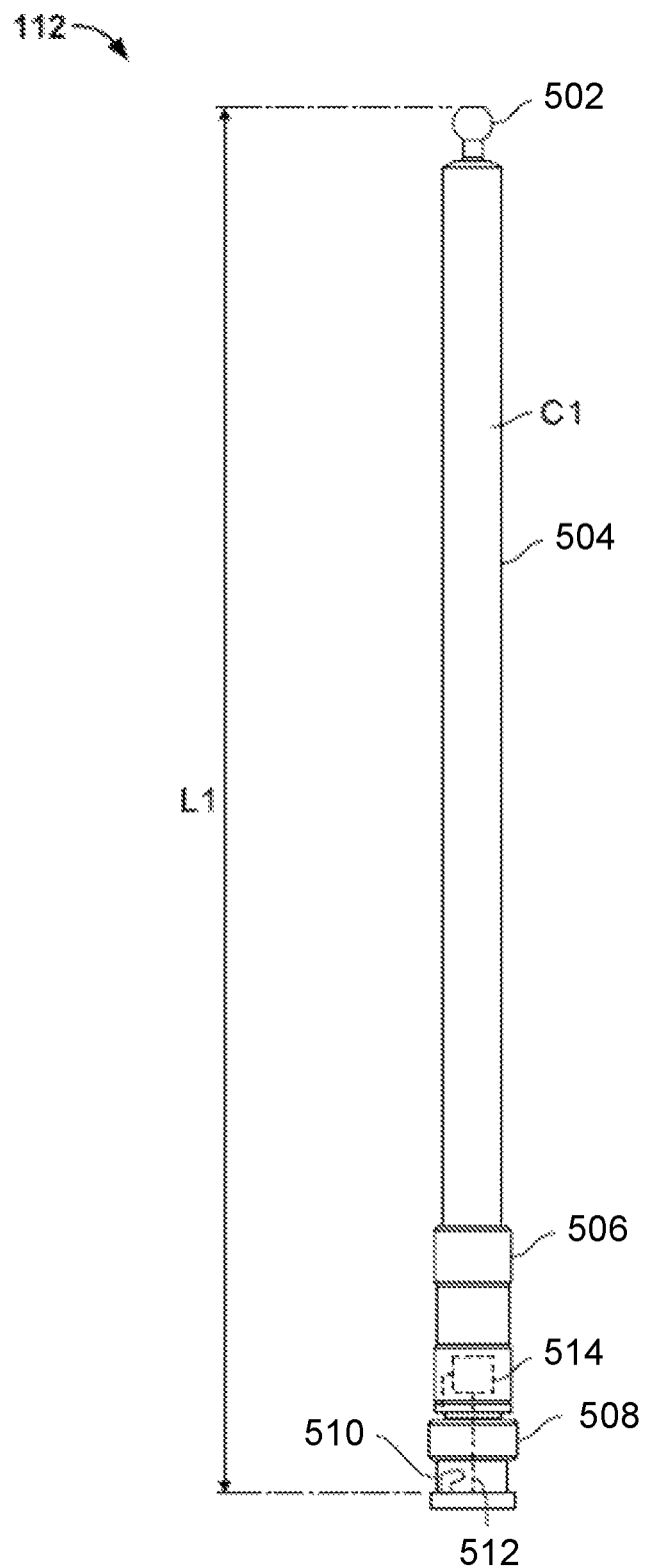
FIG. 11 is a side view of an example stem.
Figure 12:
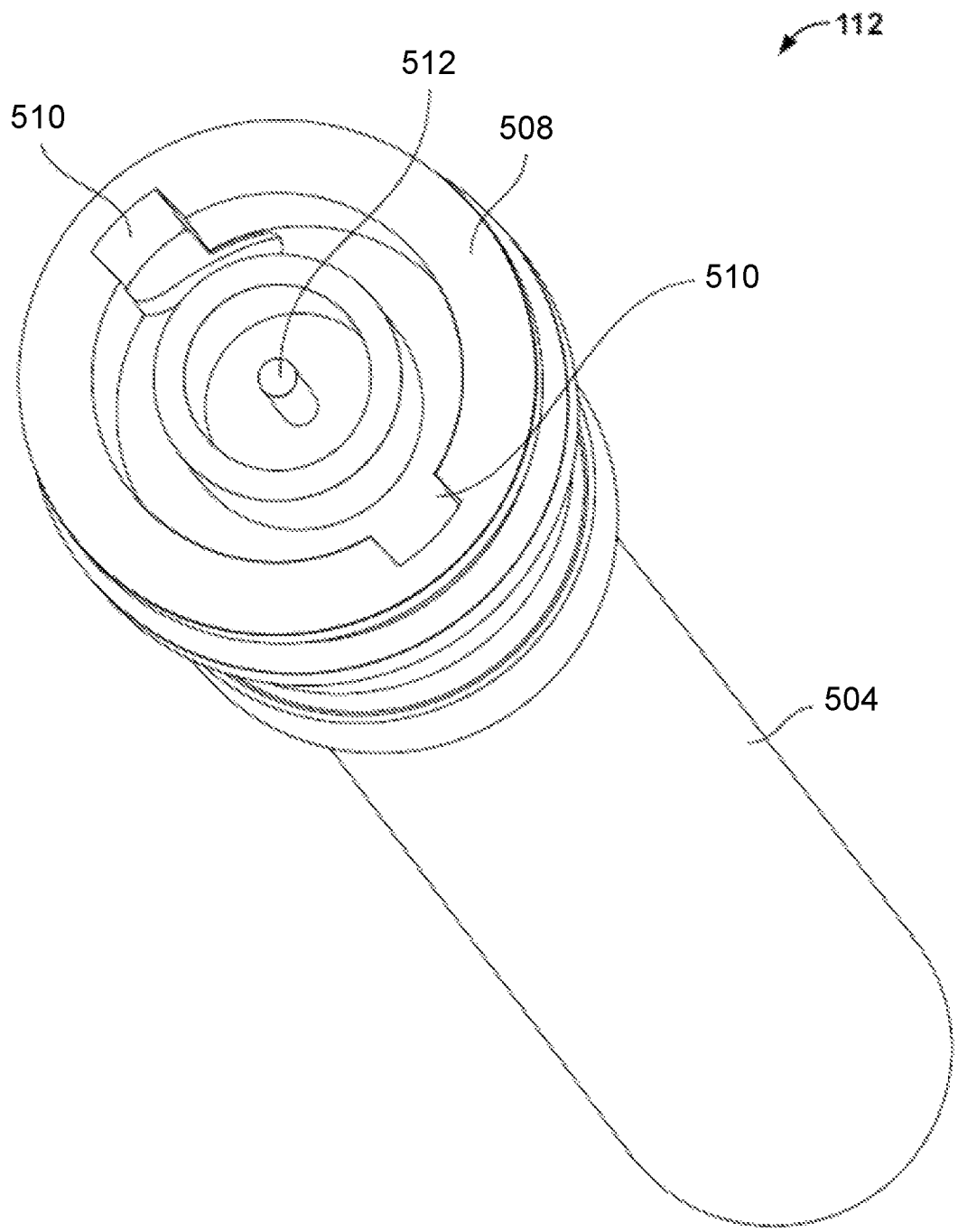
FIG. 12 is a perspective end view of the example stem of FIG. 11.

FIGS. 9-20 illustrate example embodiments of the target assembly 104, such as including the attachment device 110, the stem 112, and the target device 114. FIGS. 9-10 illustrate an example of the attachment device 110. FIGS. 11-12 illustrate an example of the stem 112. FIGS. 13-20 illustrate an example of the target device 114.

FIG. 9 is a perspective view of an example attachment device 110. FIG. 10 is another perspective view of the example attachment device 110, shown in FIG. 9. The attachment device is configured to attach to the frame 94 (or other portion) of the vehicle 90, such as illustrated in FIG. 1.

In this example, the attachment device 110 includes a body 402 and a stem engagement device 408. The body 402 includes a face surface 404 that is configured to abut a surface of the frame 94. The attachment device 110 includes a fastener 406, such as a magnet, that magnetically attaches the attachment device 110 to the frame 94 at a desired location. In some embodiments, the fastener 406 is a rare-earth magnet that provides a relatively high attachment force. Other embodiments include other fasteners 406, such as an adhesive, tape, clip, hook, bolt, nail, strap, or other device capable of fastening to the frame 94 or other portion of a vehicle. In some embodiments, the face surface 404 has a ring-shape that protrudes from a central region. The protrusion permits a bolt, screw, or other protruding feature of the frame 94 to be received therein.

The attachment device 110 typically includes the stem engagement device 408 configured to engage with a portion of the stem 112. In some embodiments, the stem engagement device 408 forms a socket joint for receiving a ball portion of the stem 112. The socket joint permits the ball portion to pivot within the socket. Ball portion of the stem 112 can be inserted by applying a sufficient insertion force, which causes arms of the stem engagement device 408 to expand to receive the ball portion into the socket. Similarly, a sufficient removal force will cause arms of the stem engagement device 408 to expand, thereby releasing the ball portion from the socket. Other stem engagement devices are used in other embodiments.

In some embodiments, the attachment device 110 is used with an adapter. The adapter is arranged between the attachment device 110 and the frame. A variety of different adapters can be used to permit attachment to various features of the frame, such as holes, studs, bolts, or other features of the frame. In some embodiments, magnets are included within the adapter rather than, or in addition to being in the attachment device 110. One or more small round magnets are used in some embodiments, which can be pressed into holes formed in the adapter body, which may be formed of aluminum or one or more other non-ferrous materials. In another embodiment, a magnetic ring is used, with or without non-ferrous material added to it.

FIGS. 11-12 illustrate an example stem 112. FIG. 11 is a side view of the example stem 112, and FIG. 12 is a perspective end view of the example stem 112. In this example, the stem 112 includes a ball portion 502, an extension member 504, a coupler 506, and a connector 508.

The stem 112 is configured to connect between the attachment device 110 and the target device 114. The stem 112 allows the target device 114 to hang a distance L1 below attachment device 110, so that target device 114 can be arranged within the path of laser beams 103, as shown in FIG. 1.

The ball portion 502 is configured to engage with the stem engagement device 408 to allow the stem to be hung from the attachment device 110, when the attachment device 110 is connected to the frame 94. Other joints or fasteners are used in other embodiments.

The ball portion 502 extends from an end of the extension member 504. The extension member performs the function of separating the ball portion 502 from the connector 508 by a desired distance. In some embodiments, a plurality of differently sized stems 112 are provided as a kit, and the user can select from the plurality of differently sized stems to obtain a stem 112 that has a length L1 suitable to lower the target device 114 into the path of laser beams 103. In some embodiments, the extension member 504 is color coded with a color C1. The color C1 is associated with a length L1 of that particular stem 112. An example of the color coding is illustrated in Table 1.

TABLE 1

Stem Length Color Codes

| {{Type}} | {{Stem Color}} | {{Length L1}} (mm) | {{Kit Quantity}} | {{Resistance}} (ohms) |
|---|---|---|---|---|
| Lower Stem | Black | 44.73 | 10 | 1K |
| Lower Stem | Silver | 75.72 | 10 | 1.8K |
| Lower Stem | Red | 155.23 | 10 | 2.7K |
| Lower Stem | Gold | 232.77 | 10 | 3.7K |
| Lower Stem | Green | 312.88 | 10 | 4.8K |
| Lower Stem | Blue | 392.53 | 10 | 5.9K |
| Lower Stem | Purple | 472.87 | 10 | 7.15K |
| Upper Stem | Red | 177.53 | 6 | — |
| Upper Stem | Gold | 252.54 | 6 | — |

In this example, a kit comes with a plurality of differently sized stems 112. The lengths L1 are, for example, the overall length from the top of the ball portion 502 to the bottom of the connector 508. In some embodiments this data is stored as a lookup table in memory of a computing device. In some embodiments additional data regarding relevant lengths is stored in memory. For example, in some embodiments a distance from a center point of the ball portion 502 to a center line of the target device 114 is computed for each stem 112, when the target assembly 104 is fully assembled. This distance is referred to as the optimized functional length of the stem 112. This value is subsequently used, in some embodiments, to determine the location of the feature of the frame 94 to which the attachment device 110 is attached, as discussed below. The example kit described in Table 1 is only one possible example of a kit. Other possible embodiments include other quantities and collections of stems.

In some embodiments, multiple types of stems are included. For example, lower stems 112 are used as illustrated in FIG. 1 to hang the target device 114 from a location on the frame 94. Upper stems are used in cooperation with an upper tram, discussed in more detail herein, to hang the target device 114 from the upper tram.

A coupler 506 is used in some embodiments to connect the extension member 504 with the connector 508. The connector 508 is, for example, a device that connects the stem 112 with a target device 114. In some embodiments, the connector 508 is a male Bayonet Neill-Concelman (BNC) type of connector, although other embodiments include other connectors. In some embodiments, BNC connectors include one or more slots 510 for receiving corresponding pins of a female BNC connector, which allows the female connector to be inserted straight into the connector 508 and then rotated to lock the female connector in place within the male connector 508. To remove the female connector, a slight inward force is applied, and then the female connector is rotated and removed out from the male connector 508.

In some embodiments, the connector 508, and/or the coupler 506 are water tight and sealed from fluid intrusion (when connector 508 is mated with the female connector). This prevents water (such as from vehicle 90) from entering the connector 508.

In some embodiments, the stem 112 includes an automatic identification device that allows the target device 114 to identify which stem 112 it is connected to. An example of an automatic identification device is a conductive element coupled to a resistive element 514. The resistance of the resistive element can be detected by the target by an electrical connection between the conductive element 512 and the connector 508 housing, for example. Once the resistance is known, the target device 114 (or another device) uses a lookup table, in some embodiments, to determine the length L1 of the associated stem 112. Other identification devices are used in other embodiments. For example, other electrical components can be used, such as a capacitor (having a given capacitance) or inductor (having a given inductance) to identify the device. Yet other embodiments include an RFID tag or wireless transmitter. Another embodiment includes an integrated circuit or microprocessor that communicates identification information to the target device 114. In some embodiments, the target devices turn on automatically when the stem 112 is connected to it.

Figure 14:
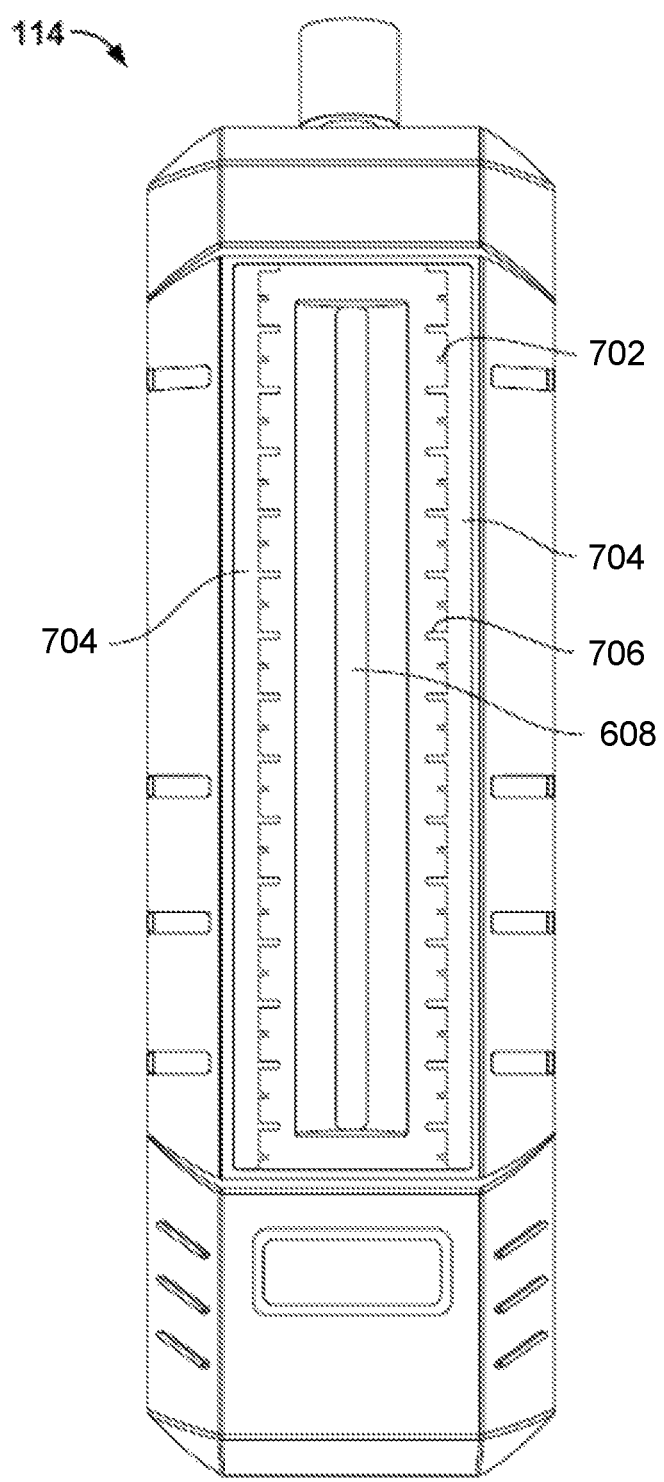
FIG. 14 is a front view of the target device of FIG. 13.

FIGS. 13 and 14 illustrate examples of the target device 114. FIG. 13 is a front perspective view of the example target device 114, and FIG. 14 is a front elevational view of the example target device 114.

In some embodiments, the target device 114 includes a housing 602, a connector 604, charging contacts 606, an optical detector 608, status indicators 610, position indicators 612, a synchronization detector 614, and a boot 616.

The housing 602 forms a protective enclosure for the target device 114, which contains various components therein, such as electrical circuitry, a circuit board, and batteries. In some embodiments, the housing 602 is sealed against fluid intrusion. An example of a suitable material for the housing 602 is a polymer, such as plastic. Other embodiments include other materials.

The connector 604 is provided in some embodiments to connect the target device 114 with stem 112. An example of the connector 604 is a female BNC connector. In some embodiments the connector 604 includes one or more pins 620 that are configured to engage with slots 510 of the stem connector 508. In another possible embodiment, the connector 604 is a male connector, while the connector 508 is a female connector. Yet other connectors are used in other embodiments. In this example, the connector 604 is coupled to an upper portion of the housing 602, and is substantially aligned with a vertical center of mass of the target device 114 so that the target device 114 will hang substantially vertically when suspended by attachment device 110 and stem 112. In some embodiments, one or more of connectors 604 and 508 are spring loaded.

The charging contacts 606 are provided in some embodiments to receive power from an external source for recharging batteries contained within the target device 114. In some embodiments the target device 114 includes a battery recharging module that is electrically connected to charging contacts. The battery recharging module includes, for example, electronics configured to properly recharge the batteries, such as a smart charger that prevents overcharging of the batteries. In some embodiments the battery recharging module is configured to perform trickle charging to maintain a battery in a fully charged state after recharging. Other embodiments do not include a battery recharging module, which may, instead, be provided by an external device, such as cart 108 as discussed in more detail herein.

The optical detector 608 is provided in some embodiments to detect light generated by the scanner 102. An example of an optical detector is a sensor array, such as an array of photodiodes. The optical detector 608 operates to detect when a laser beam 103 of the scanner 102 hits the optical detector 608. Also, in some embodiments, the optical detector 608 further determines a position along the optical detector 608 where the laser beam 103 made contact with the optical detector 608. In some embodiments the optical detector is arranged co-axial with a vertical center of gravity of the target device 114.

In some embodiments, the optical detector 608 includes the light control device 116 to control light (e.g., laser beams from the scanner 102) detected by the optical detector 608. Examples of the optical detector 608 and the light control device 116 are illustrated and described in more detail with reference to FIGS. 15 and 21-31.

One or more status indicators 610 are provided in some embodiments to indicate an operating status of the target device 114. In some embodiments, the status indicators 610 include one or more lights, such as light emitting diodes. The lights are arranged in some embodiments such that at least one light is visible from any horizontal direction (when the target device 114 is arranged vertically as shown), such as in any location 360° around the target device 114. As shown in FIG. 13, some embodiments include the status indicators 610 on the left and right sides, as well as portions of the front and back sides (the rear side of the status indicator being a mirror image of the front side). Other embodiments include other configurations.

One of more status codes are provided by the status indicators 610. For example, in some embodiments the status indicator turns on when the target device 114 is powered on in some embodiments, and turns off when the target device 114 is powered off. In another possible embodiment, multiple different colored lights are used to represent different statuses. For example, in one possible embodiment the following status lights are used: (1) red indicates that an error has been detected, (2) blue indicates that the target is on and has received a sync signal but not detected a laser beam, (3) green indicates that the target is on and has received a sync signal and detected a laser beam, and (4) magenta indicates that the target is on but is not detecting sync or laser beams. Status lights can be constant on or flashing. In some embodiments, the computing device sends a message to the target device 114 through scanner 102 asking the target to identify itself. When the target device 114 receives the message, a white status light flashes so that the operator can identify the particular target.

The position indicators 612 are provided in some embodiments to provide a visual indication of the position of the target device 114 relative to an expected or desired position. Some embodiments do not include position indicators 612, while other embodiments include one or more position indicators 612. One possible embodiment includes a single position indicator 630. The position indicator 630 can include multiple lights, in some embodiments, so that it is more easily visible from different locations around the target device 114. For example, left position indicator 630*a* can include one or more lights that are easily visible toward the left side of the target device 114, while right position indicator 630*b* can include one or more lights that are easily visible toward the right side of the target device 114.

The position indicator 630 indicates, for example, how close to the expected position the target device 114 is at a given time. Multiple differently colored lights are provided in some embodiments, such as a red light, a yellow light, and a green light. The red light indicates that the target device 114 is outside of a specified range of positions. The yellow light indicates that the target device 114 is within a specified range of acceptable positions. The green light indicates that the target is within a preferred range of positions.

As one example, suppose that a target device 114 is initially positioned so that it is outside of a specified range of positions. In this situation, the position indicator 630 of the target device 114 may be red. An operator may then use a winch or other device to attempt to adjust the frame. While the adjustment is being made, the target device 114 continues to monitor its current position and adjusts the position indicator 630 to yellow as soon as the position comes to within a specified range of acceptable positions. The operator may continue adjusting the frame, for example, until the position indicator 630 is adjusted to green, showing that the target device 114 (and the frame to which it is ultimately attached) is within a preferred range of positions.

In some embodiments, if the operator inadvertently adjusts the frame too far, such that the target device detects that the position has started to go outside of the preferred range of positions in the opposite direction from the original position, the position indicator 630 illuminates a different colored (e.g., blue) light to indicate that the adjustment has gone too far and that the target is not within the preferred range of positions. If the adjustment continues in the wrong directly, a magenta light is used to indicate that the operator has gone far past the original position.

It is noted that although the position of the target is sometimes referred to herein, a position of the stem, a position of an attachment device, or a position of a part of a frame can alternatively be used by computing the respective distance that the position is from the target position.

Another possible embodiment includes multiple position indicators, such as three position indicators including height indicator 630, width indicator 632, and length indicator 634. In this embodiment, the height indicator 630 indicates the height position of the target device 114 with respect to an expected height, the width indicator 632 indicates a width position of the target device 114 with respect to an expected width position, and the length indicator 634 indicates a length position of the target device 114 with respect to an expected length. In this way, the target device 114 provides a visual indication to the operator that tells the operator whether the frame to which the target device 114 needs to be adjusted vertically, laterally, longitudinally, or a combination of these.

The terms longitudinally and laterally are used with respect to the length of the vehicle, such that a longitudinal axis extends between the front and rear of the vehicle, and a lateral axis extends between left and right sides of the vehicle.

The synchronization detector 614 is provided in some embodiments to detect a synchronization signal, such as generated by the scanner 102. The synchronization detector is, for example, an infrared detector.

The protective boot 616 is provided on one or more external surfaces of the housing 602 in some embodiments, such as around a bottom portion of the target device 114. The boot 616 is typically made of a shock absorbing material, such as a rubber material, to protect the target device 114 from a sudden shock, such as if the target device 114 is accidentally dropped or otherwise comes into contact with another object. In some embodiments, the protective boot 616 also acts to protect other objects in case of contact with the target device 114. For example, the protective boot 616 can protect a body of a vehicle from an unintended scratch or dent if the target device 114 were to make contact with the body.

FIG. 14 is a front view of an example of the target device 114. In this example, the housing 602 includes a face surface 702 that surrounds the optical detector 608.

In some embodiments, at least portions of face surface 702 have a color. The color is selected such that the laser beam 103 is easily visible on the face surface 702 when it comes into contact with the face surface 702. In some embodiments the portions of face surface 702 are in the form of measurement bars 704. In this example, measurement bars are white. Laser beam 103 is easily visible on the white surface. In some embodiments other portions of the housing 602 have a dark color, such as black, on which laser beam 103 is not as easily visible.

In some embodiments, the measurement bars 704 include ruled markings 706 that allow an operator to estimate distances. In some embodiments larger ruled markings are used to identify points that are one centimeter apart, while smaller ruled markings are used to identify points that are 5 mm away from each larger ruled marking. Other ruled markings are used in other embodiments.

Figure 15:
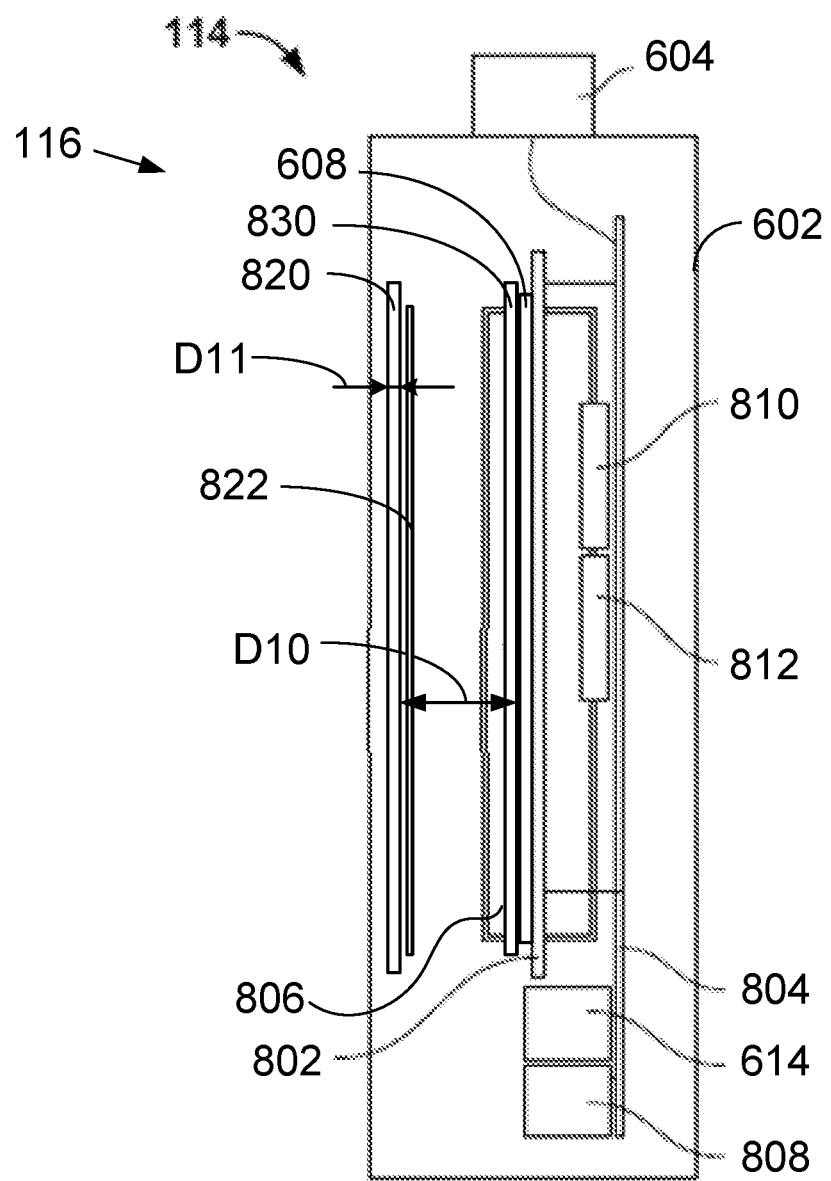
FIG. 15 is a side cross-sectional block diagram of the target device of FIG. 13.
Figure 16:
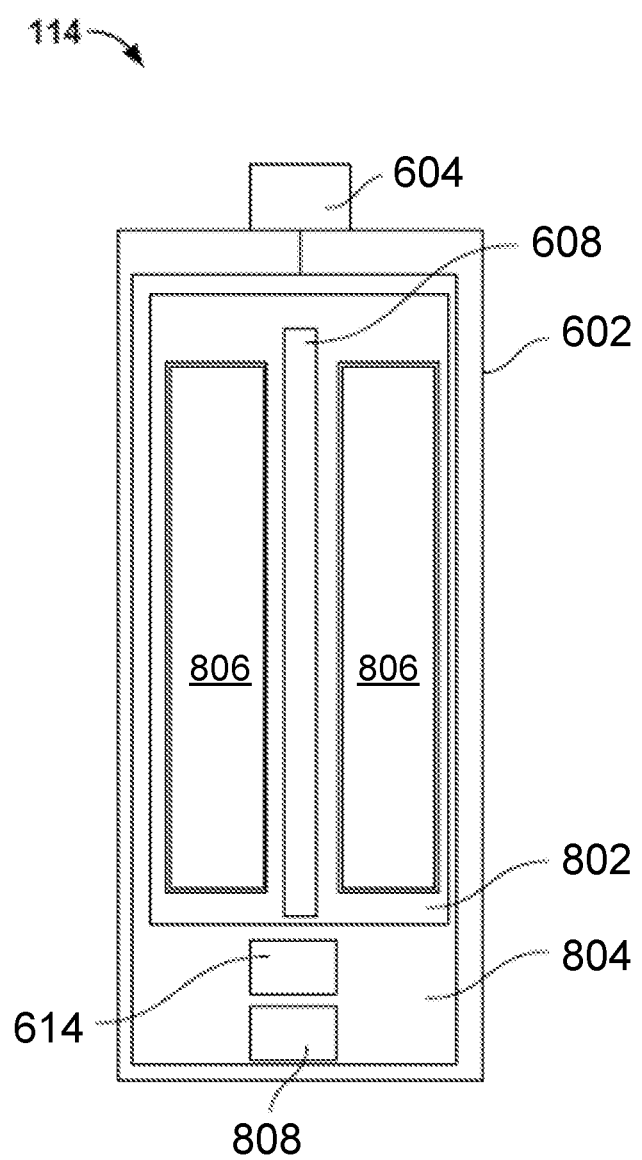
FIG. 16 is a front cross-sectional block diagram of some components of the target device of FIG. 13.

FIGS. 15-16 illustrate additional block diagrams of example target devices 114. FIG. 15 is a side cross-sectional block diagram of the target device 114, and FIG. 16 is a front cross-sectional block diagram of some components of the target device 114.

In this example, the target device 114 includes the housing 602, the connector 604, the optical detector 608, the synchronization detector 614, one or more circuit boards 802 and 804, one or more batteries 806 (i.e., one battery, two batteries, etc.), a communication device 808, and other electronic circuitry, such as a processor 810 and memory 812.

At least some electronic circuitry is typically included on one or more circuit boards, such as a circuit board 802 and a circuit board 804. Examples of electronic circuitry are discussed herein. One example of electronic circuitry is programmable circuitry, such as including processor 810 and memory 812. In some embodiments, the memory 812 stores instructions, which when executed by the processor 810 cause the processor 810 to perform one or more methods or operations, such as those discussed herein. In some embodiments the batteries 806 are supported by or connected to one or more of the boards 802 and 804. In another embodiment, the batteries 806 are contained within the housing and are electrically coupled to the electronic components of the target device 114, but are physically separated from the boards 802 and 804.

Electronic circuitry is powered, in some embodiments, by one or more batteries 806, contained within the housing 602. In some embodiments, the target device 114 is normally off, but automatically powers on when connected with the stem 112. For example, in some embodiments an electronic circuit between the batteries 806 and the electronic circuitry is normally open at the connector 604. The circuit is closed upon connection of the stem 112 and current flows through the conductive element 512, the resistive element 514, and the connector 508. In some embodiments the current flow does not go through outer the connector 508, but rather through another connector.

Electronic circuitry includes, in some embodiments, a battery charging module that is electrically coupled to the batteries 806 to recharge the batteries 806 after use. While some embodiments include rechargeable batteries, other embodiments include disposable batteries. In some embodiments, the batteries store enough power to allow the target device 114 to operate for more than 8 hours under normal use. In other embodiments, batteries store enough power for more than 6 hours of use, or for more than 16 hours of use. Other embodiments use other power sources, such as receiving power through a wire, or from a solar panel, etc.

In some embodiments electronic circuitry further includes the synchronization detector 614 and the communication device 808. The synchronization detector 614 is discussed above, and operates, for example, to detect a synchronization signal generated by the scanner 102. The communication device 808 is a device that operates to communicate with another device, such as the scanner 102 or a computing device, such as in the cart 108. An example of the communication device 808 is a radio frequency communication device. In some embodiments the communication device 808 communicates digital data utilizing a data communication protocol, such as one of the family of 802.11 protocols. For example, in some embodiments the processor 810 of the target device 114 utilizes the communication device 808 to communicate digital data with the communication circuitry 314 of the scanner 102. In other possible embodiments, the communication device 808 communicates digital data with a computing device, such as contained within the cart 108. In some embodiments, communication between the target device 114 and the scanner 102 and between the target device 114 and the computing device is direct communication. In some embodiments, the target devices 114 only directly communicate with the scanner 102. In other embodiments, the target devices 114 only directly communicate with the cart 108.

As illustrated in FIG. 15, in some embodiments, the optical detector 608 is mounted to the circuit board 802. In some embodiments, the light control device 116 is arranged in the housing 602 to be associated with the optical detector 608. Some examples of light control device 116 include a light shaping diffuser 820 and a target mask 830. In some embodiments, the light control device 116 includes either of the light shaping diffuser 820 or the target mask 830. In other embodiments, the light control device 116 includes a combination of the light shaping diffuser 820 and the target mask 830. Examples of the light control device 116 for the optical detector 608 on the circuit board 802 are described and illustrated with reference to FIGS. 21-31.

Figure 17:
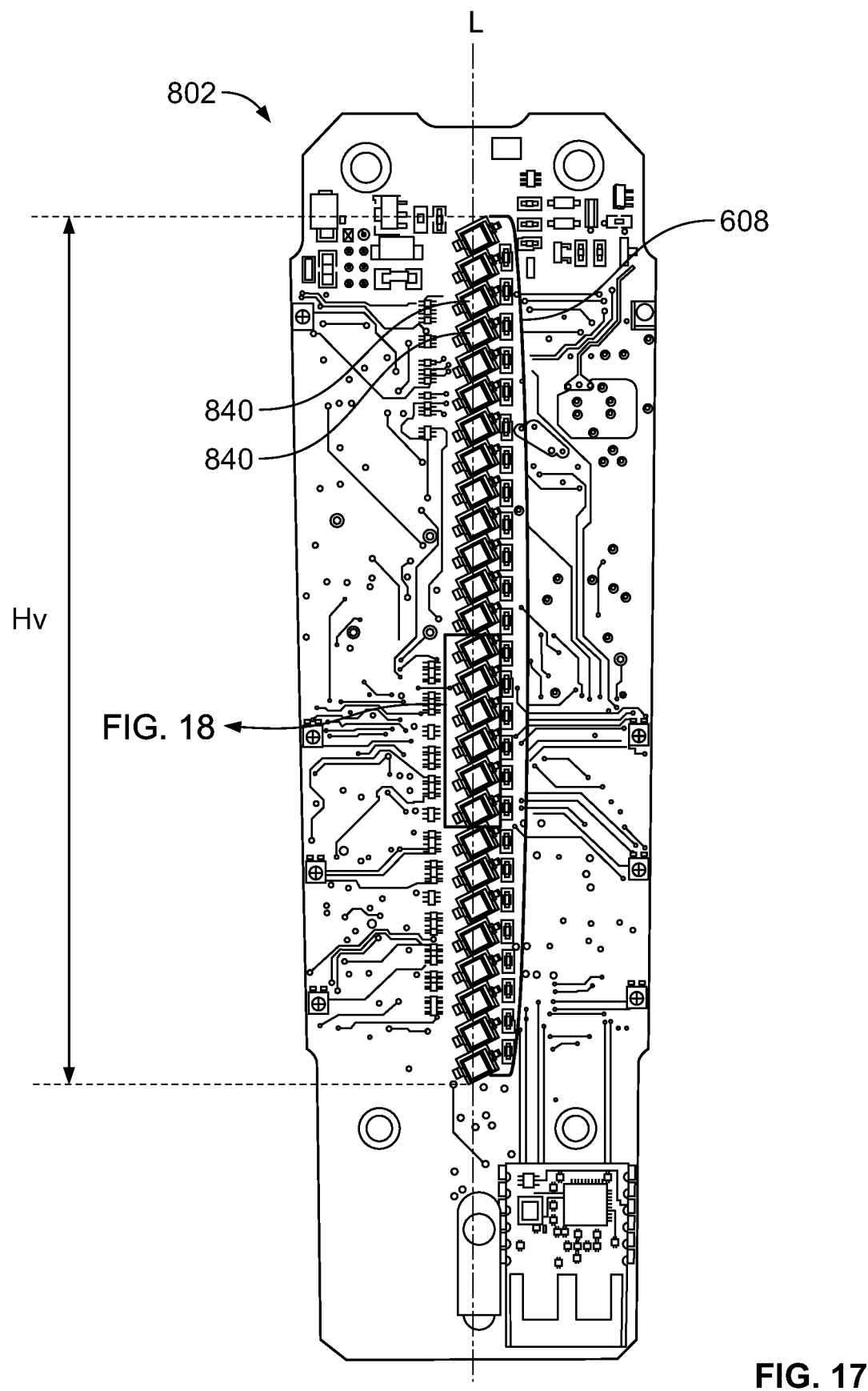
FIG. 17 illustrates an example circuit board mounting an optical detector.
Figure 18:
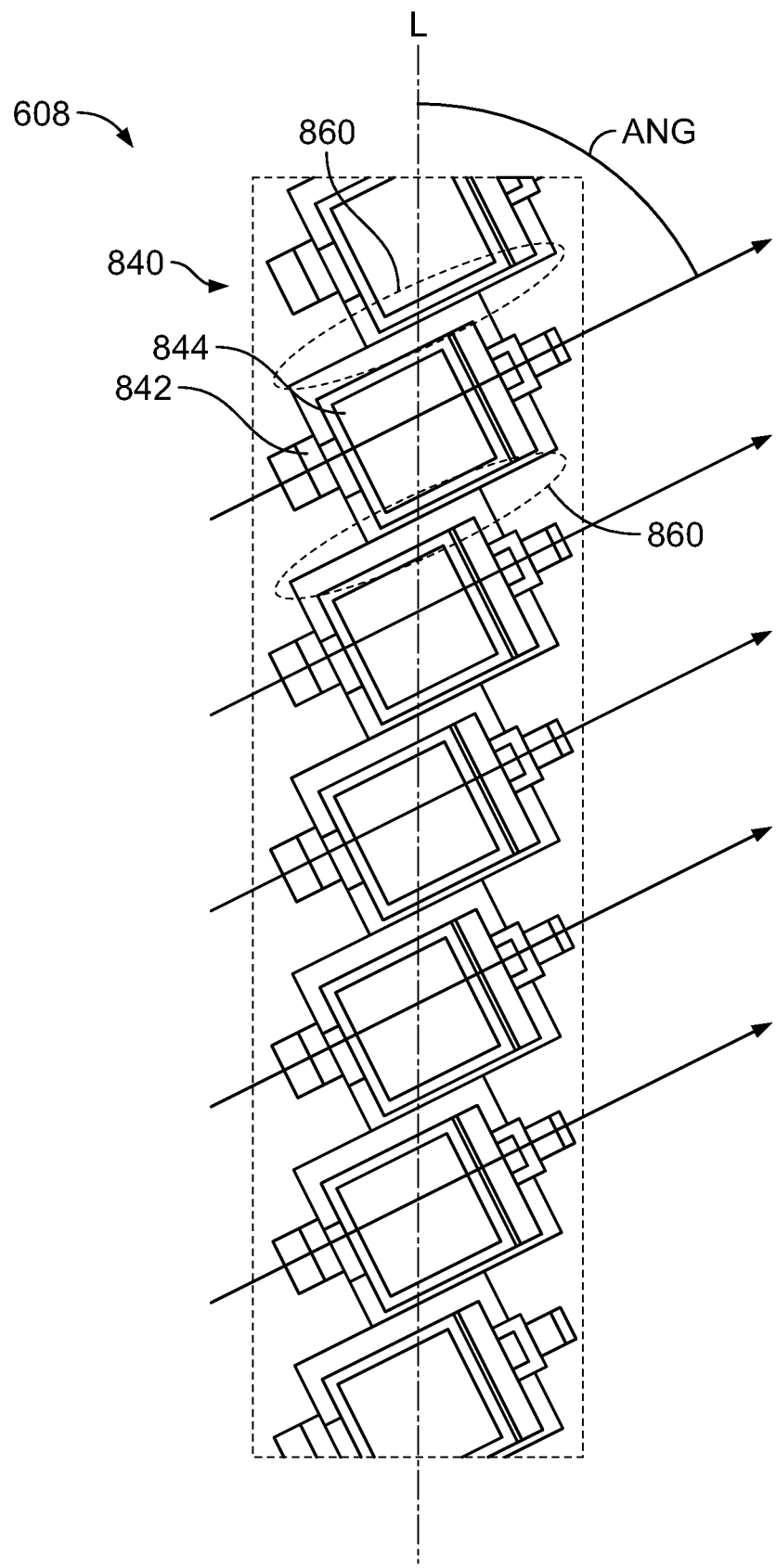
FIG. 18 is an expanded view of the optical detector of FIG. 17.
Figure 19:
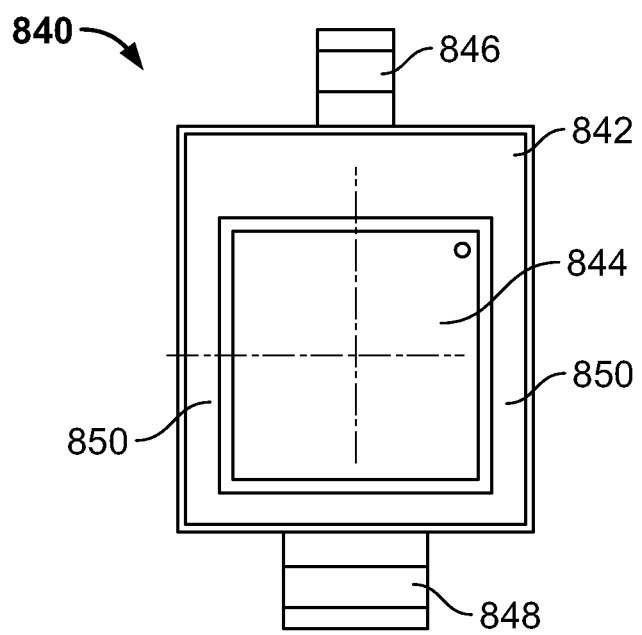
FIG. 19 is a front schematic view of an example photodiode device used for the optical detector.
Figure 20:
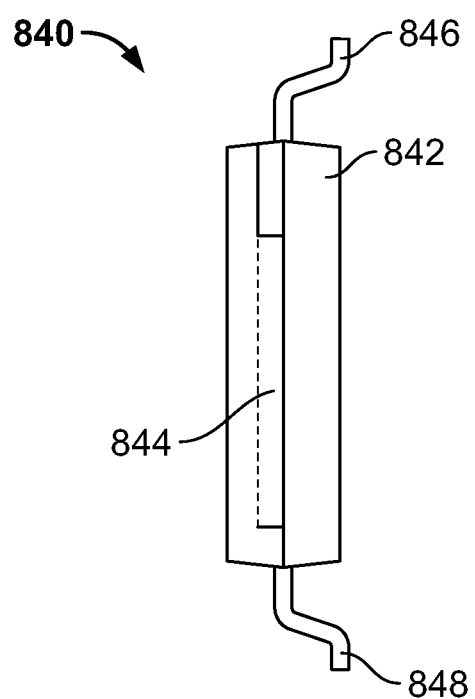
FIG. 20 is a side schematic view of the photodiode device of FIG. 19.

Referring to FIGS. 17-20, an example of the optical detector 608 is described. In particular, FIG. 17 illustrates an example of the circuit board 802 mounting the optical detector 608. FIG. 18 is an expanded view of the optical detector 608 of FIG. 17. FIG. 19 is a front schematic view of an example photodiode device used for the optical detector 608, and FIG. 20 is a side schematic view of the photodiode device of FIG. 19.

In an example embodiment, the optical detector 608 is a sensor array including a plurality of optical sensors, the number of optical sensors being in a range from about 10 to about 100, and in another possible embodiment, being in a range from about 20 to about 40. In some embodiments the optical detector 608 has a vertical height Hv in a range from about 5 cm to about 30 cm, and in another possible embodiment, from about 10 cm to about 15 cm.

In some embodiments, the optical detector 608 operates to generate instantaneous peak signals from each end of the sensor array. The ratio of the difference over the sum of these two signals provides an approximate position that the laser beam 103 was detected along the range of the optical detector 608. In some embodiments the sensor array is non-linear. A look-up table with interpolation is used in some embodiments to identify the position of the laser beam with respect to the optical detector 608. The lookup table is stored in memory in some embodiments, such as on the target device 114, or on the scanner 102, or on a computing device, such as within the cart 108.

As illustrated in FIGS. 17 and 18, one example of the optical detector 608 includes a photodiode array having a plurality of photodiode devices 840 arranged along an imaginary line L. The circuit board 802 mounting the optical detector 608 can be disposed within the housing 602 such that the imaginary line L is in line with the longitudinal axis of the target device 114. In one example, the cathodes of each of the photodiode devices 840 are shorted to a voltage source, while the anodes of the photodiode devices 840 are electrically coupled along a resistive ladder. Electrical circuitry is then coupled to each end of the photodiode array to detect the respective currents (or voltages).

Referring to FIGS. 19 and 20, the photodiode device 840 include a frame 842 and a light active element 844 mounted to the frame 842. The light active element 844 is a sensitive region that absorbs photons of laser beams. In this document, the light active element 844 is also referred to as a light detection element or area, a light active area, or the like. The frame 842 houses the light active element 844 and exposes the light active element 844 therethrough. In some embodiments, the frame 842 is made of transparent material, or includes a transparent portion, such that the light active element 844 is exposed therethrough. An anode 846 and a cathode 848 extend out from the frame 842. As the frame 842 surrounds the light active element 844, the frame 842 has a bezel portion 850 around the edge of the light active element 844. As illustrated in FIGS. 17 and 18, the bezel portion 850 of each photodiode device 840 contributes to a blind area 860 between adjacent photodiode devices 840 when the photodiode devices 840 are arranged to be adjacent to, or abut with, each other. As described herein, the blind areas 860 can result from spaces between adjacent photodiode devices and are not able to receive and detect light from the scanner. Such spaces can be formed because of the bezel portions of photodiode devices and/or because photodiode devices are discretely disposed each other. The blind areas do not detect light and therefore creates a null, which can cause inaccurate readings of the light emitting from the scanner.

One example of the photodiode device 840 is model number PDB-C160SM, available from Advanced Photonix, Inc., Roanoke, Va. Other types of photodiodes can be used for the photodiode device 840.

As shown in FIG. 18, in some embodiments, the plurality of photodiode devices 840 are arranged along the longitudinal axis L and oriented at an angle ANG relative to the longitudinal axis L. In the illustrated example, the optical detector 608 includes 27 photodiode devices 840 in series. In other examples, however, the optical detector 608 includes other numbers of photodiode devices 840. Each of the photodiode devices 840 is tilted at any suitable angle. In some embodiments, the photodiode devices 840 are angled from about 5 to about 85 relative to the longitudinal axis L. In other embodiments, the photodiode devices 840 are angled from about 20 to about 70 relative to the longitudinal axis L. In yet other embodiments, the photodiode devices 840 are angled from about 40 to about 50 relative to the longitudinal axis L. In some embodiments, all of the photodiode devices 840 are oriented at the same angle. In other embodiments, at least one of the photodiode devices 840 is oriented at a different angle from the rest of the photodiode devices 840. As illustrated below with reference to FIG. 22, such an angled orientation of photodiode devices can improve detection of light that hits on or around the blind areas 860 between adjacent photodiode devices 840, and therefore help reducing the implication of the blind areas 860.

Alternatively, another example of an optical detector includes a fluorescent bar. The fluorescent bar is made of a material that can absorb light generated by the laser beam 103 in the scanner 102. For example, the laser beam 103 is an ultraviolet laser beam. Once the fluorescent bar has absorbed light from the laser beam 103, the fluorescent bar fluoresces. In some embodiments, the fluorescing is detected by photocells positioned at each end of the fluorescent bar. The position of the laser beam along the fluorescent bar can then be determined by comparing the signals from each photocell, such as by taking a ratio of the difference over the sum and linearizing the result with a look-up table. Some embodiments include multiple optical detectors 608, such as sensor array and a fluorescent bar.

Figure 21:
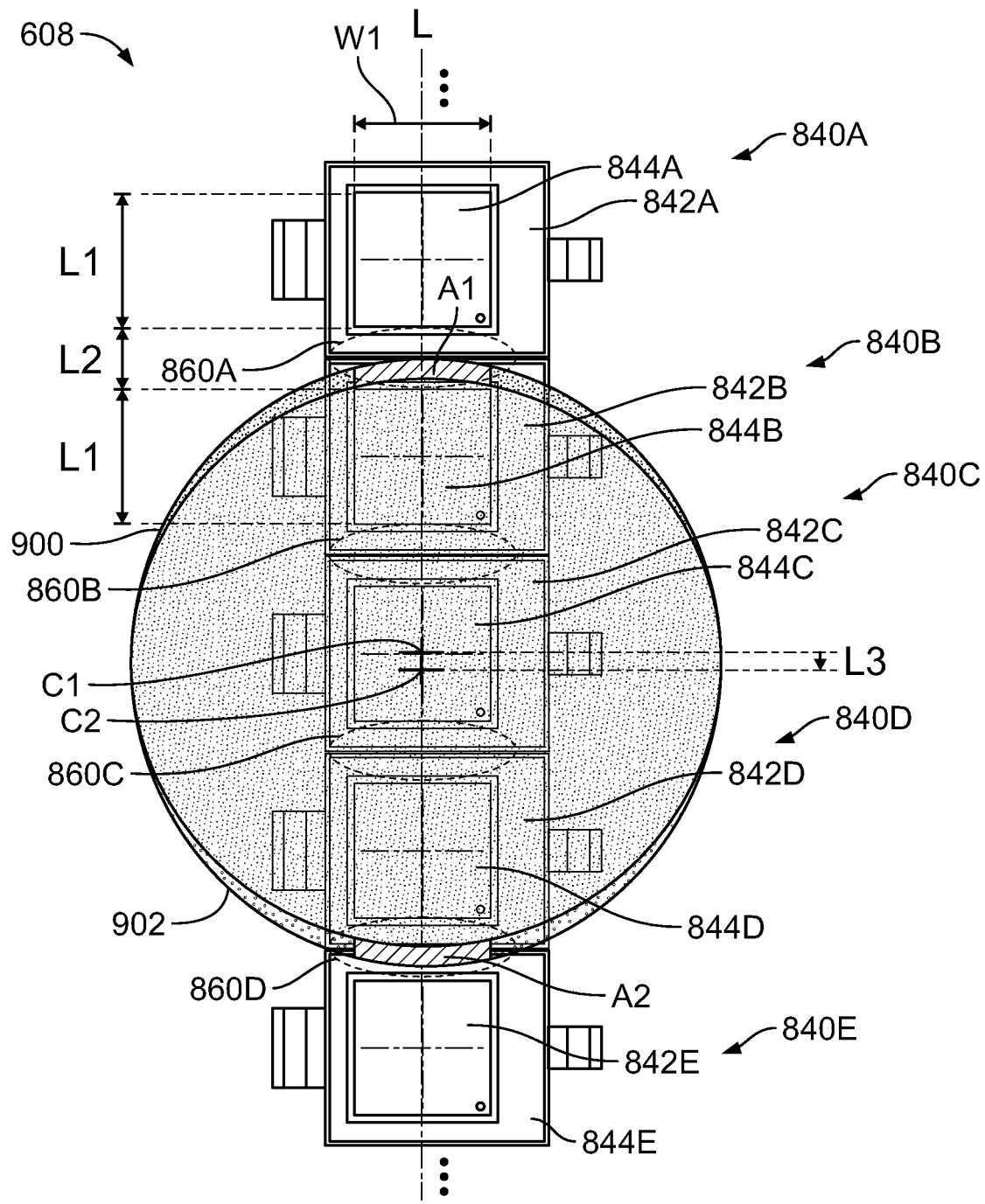
FIG. 21 illustrates an exemplary embodiment of the optical detector.

FIG. 21 illustrates an exemplary embodiment of the optical detector 608. In this example, the optical detector 608 is configured such that a plurality of photodiode devices 840 is arranged in series along the longitudinal axis L, and each of the photodiode devices 840 is oriented horizontally (i.e., at a right angle relative to the longitudinal axis L). In FIG. 21, five photodiode devices 840 (i.e., first, second, third, fourth, and fifth photodiodes 840A, 840B, 840C, 840D, and 840E) are depicted for illustrative purposes. The photodiodes 840A, 840B, 840C, 840D, and 840E includes frames 842A, 842B, 842C, 842D, and 842E and light active areas 844A, 844B, 844C, 844D, and 844E, respectively. Some embodiments of the light active areas 844A, 844B, 844C, 844D, and 844E have the same dimension, such as a height L1 and a width W1. Located between the light active areas 844A, 844B, 844C, 844D, and 844E are the blind areas 860 (including 860A, 860B, 860C, and 860D).

By way of example, a first light beam 900 is directed to a target device 114, at least a portion of the optical detector 608 of the target device 114 receives the first light beam 900. The first light beam 900 can be either a diffused light that has passed through a light diffuser that produces a cone-shape pattern (i.e., a circular pattern having the same diameter therearound), or a raw light that has not been changed or adjusted out of a light source (e.g., a laser).

In the illustrated example, the second, third, and fourth photodiodes 840B, 840C, and 840D fall within the first light beam 900, and therefore convert the detected portion of the first light beam 900 into a first amount of current. For example, the first amount of current corresponds to the total area of the light active areas 844B, 844C, and 844D of the first, second, and third photodiodes 840B, 840C, and 840D. In this example, since all of the light active areas 844B, 844C, and 844D of the second, third, and fourth photodiodes 840B, 840C, and 840D receive the first light beam 900, the first amount of current generated by the optical detector 608 corresponds to the sum of the light active areas 844B, 844C, and 844D.

As illustrated, in some embodiments, the optical detector 608 receives light not only onto the light active areas 844 of the photodiode devices 840, but also onto the blind areas 860 adjacent the photodiode devices 840. A portion of the light falling within the blind areas 860 is not detectable while a portion of the light falling within the light active areas 844 is detected as described above. Therefore, the optical detector 608 cannot measure the portion of the light directed to the blind areas 860.

In some embodiments, as described herein, a height of a point on the frame 94 is calculated based on a vertical position of a laser beam on the target device 114 along the longitudinal axis L. In some embodiments, such a vertical position of the laser beam relative to the target device 114 can be measured by obtaining the center of the laser beam detected on the optical detector 608 of the target device 114. In the illustrated example of FIG. 21, the center C1 of the first light beam 900 can be considered to be the vertical position (or a height) of the first light beam 900 relative to the target device 114 or to any other suitable reference point. In some embodiments, the center C1 of the first light beam 900 is calculated as a middle point of the array of the photodiode devices 840 that have detect the first light beam 900. For example, the center C1 of the first light beam 900 is regarded as a point along the longitudinal axis L that corresponds to the average of current generated by the light active areas 884 that have been activated by the first light beam 900.

By way of example, in the illustrated example of FIG. 21, the first light beam 900 covers all of the second, third, and fourth light active areas 844B, 844C, and 844D while not covering the other light active areas of adjacent photodiode devices 840 (e.g., 840A, and 840E). As a result, the center C1 of the first light beam 900 can be located at or around the center of the third light active area 844C along the longitudinal axis L. As the first light beam 900 moves to cover at least a portion of the other light active areas that are not covered in FIG. 21, the center C1 of the first light beam 900 will change depending on the total size of the light active areas that absorb the light beam.

In some examples, a positional change of the light beam is not accurately calculated based on the light active areas 844 of the photodiode devices 840 within which the light beam falls. For example, as shown in FIG. 21, when the first light beam 900 moves to a second light beam 902 downwards by a distance L3 along the longitudinal axis L, a first area A1 amounts to be shifted to a second area A2 along the longitudinal axis L (i.e., the first area A1 and the second area A2 are identical), and the actual center of the second light beam 902 is a center C2. However, the light active areas 844B, 844C, and 844D remain unchanged while the light beam shifts by the distance L3. As a result, the current generated with the first light beam 900 is the same in amount and location as a current generated with the second light beam 902. Accordingly, a center of the second light beam 902 is determined to remain the same as the center C1 of the first light beam 900. As such, the blind areas 860 can lead to inaccurate calculation of a position of a light beam relative to the target device 114 along the longitudinal axis L.

Figure 22:
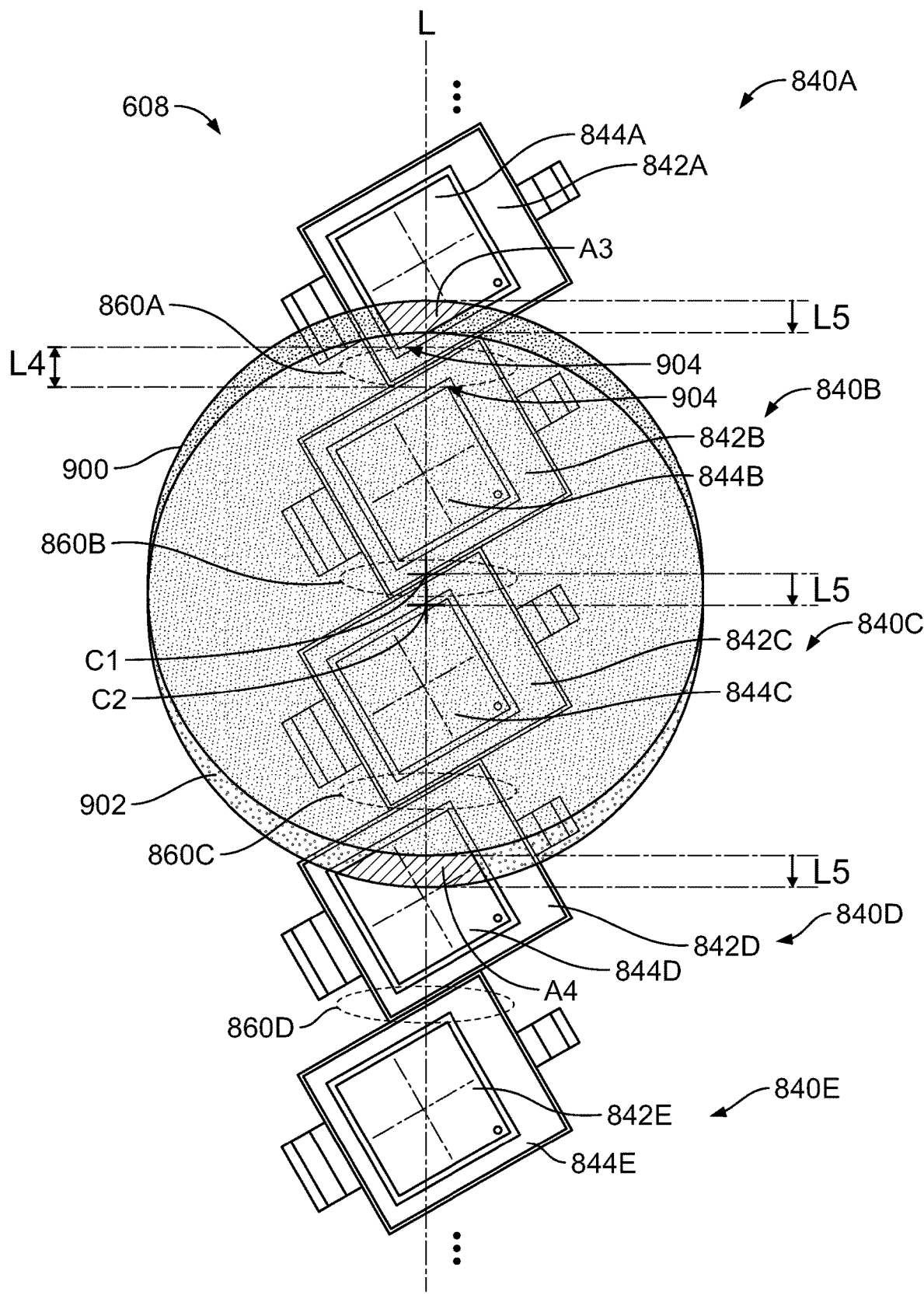
FIG. 22 illustrates another exemplary embodiment of the optical detector.

FIG. 22 illustrates another exemplary embodiment of the optical detector 608. In this example, the optical detector 608 is configured such that a plurality of photodiode devices 840 is arranged along the longitudinal axis L and oriented at an angle, as also illustrated in FIGS. 17 and 18. In FIG. 22, five photodiode devices 840 (i.e., first, second, third, fourth, and fifth photodiodes 840A, 840B, 840C, 840D, and 840E) are depicted for illustrative purposes. The photodiodes 840A, 840B, 840C, 840D, and 840E includes frames 842A, 842B, 842C, 842D, and 842E and light active areas 844A, 844B, 844C, 844D, and 844E, respectively. Some embodiments of the light active areas 844A, 844B, 844C, 844D, and 844E have the same dimension. Located between the light active areas 844A, 844B, 844C, 844D, and 844E are the blind areas 860 (including 860A, 860B, 860C, and 860D).

By way of example, when a first light beam 900 is directed to a target device 114, at least a portion of the optical detector 608 of the target device 114 receives the first light beam 900. The first light beam 900 can be either a diffused light that has passed through a light diffuser that produces a cone-shape pattern (i.e., a circular pattern having the same diameter therearound), or a raw light that has not been changed or adjusted out of a light source (e.g., a laser).

In the illustrated example, a portion of the first photodiode 840A, the second and third photodiodes 840B and 840C, and a portion of the fourth photodiode 840D fall within the first light beam 900, and therefore convert the first light beam 900 into a first amount of current. For example, the first amount of current corresponds to the total area of the light active areas 844A, 844B, 844C, and 844D that receive the first light beam 900. In this example, the portions of the first and fourth light active areas 844A and 844D that receive a portion of the first light beam 900, and all of the second and third light active areas 844C and 844D contributes to generation of the first amount of current.

In this example, the blind areas 860 can extend over a narrower distance L4 along the longitudinal axis L than the distance L2 of the blind areas 860 of the optical detector 608 in the example of FIG. 21. Since the photodiode devices 840 are angled, the edges 904 of adjacent angled light active areas 844 are arranged closer to each other along the longitudinal axis L than corresponding edges of the horizontally-arranged light active areas in FIG. 21. As such, the angled arrangement of photodiode devices 840 can reduce or eliminate the consequence of the blind areas as discussed with reference to FIG. 21.

As similarly described in FIG. 21, a center of C1 of the first light beam 900 can be calculated as a middle point of the photodiode devices 840 that have detect the first light beam 900. For example, the center C1 of the first light beam 900 is regarded as a point along the longitudinal axis L that corresponds to the average of current generated by the light active areas 884 that have been activated by the first light beam 900. In some examples, however, the angled arrangement of photodiode devices can lead to inaccurate measurement of a positional shift of the light beam along the longitudinal axis L. For example, as illustrated in FIG. 22, when the first light beam 900 shifts to a second light beam 902 by a distance L5 along the longitudinal axis L, the total size of the light active areas changes. In the illustrated example, all of the second and third light active areas 844B and 844C remain activated while the first light beam 900 changes to the second light beam 902. However, an area A3 of the first light active area 844A, which has received the first light beam 900, no longer receives the second light beam 902, while an area A4 of the fourth active area 844D, which has not received the first light beam 900, becomes activated by the second light beam 902. Since the light active areas (in particular, the first and fourth light active areas 844B and 844D in this example) are angled, the area A4 is larger than the area A3. In effect, as the first light beam 900 shifts to the second light beam 902, an amount of electric current that increases at the fourth light active area 884D is greater than an amount of electric current that decreases at the first light active area 884A. Therefore, the measurement of current generated by the light active areas determines a center of the second light beam 902 to be more biased toward the fourth photodiode device 844 than it actually is. For example, a determined center of the second light beam 902 will be located below the actual center C2 of the second light beam 902. As described below, this can be corrected by the light control device 116.

Figure 23:
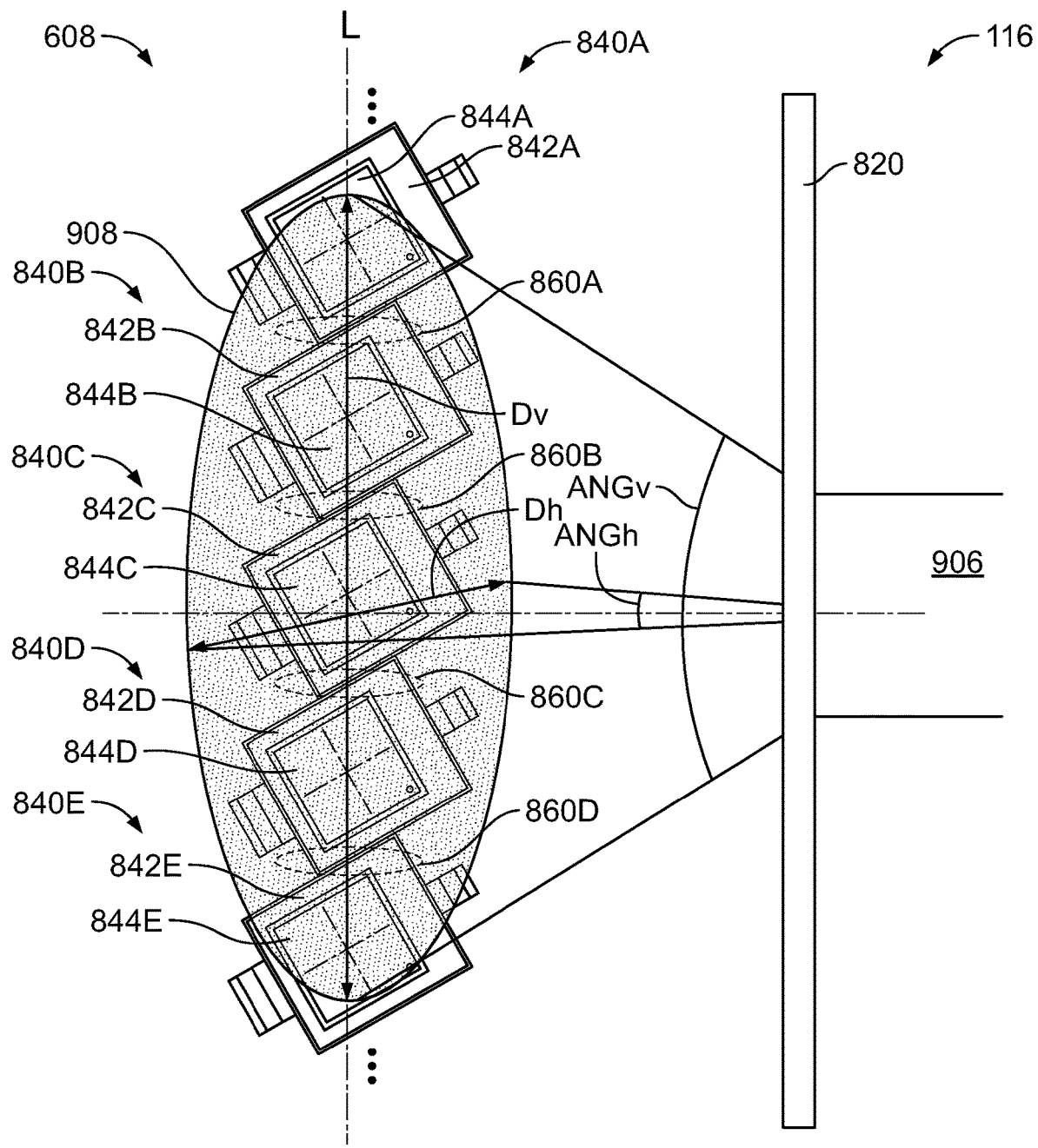
FIG. 23 schematically illustrates an exemplary embodiment of a light control device 116.

FIG. 23 schematically illustrates an exemplary embodiment of the light control device 116. In this example, the light control device 116 includes a light shaping diffuser 820, as also illustrated in FIG. 15. As described herein, the light control device 116 operates to adjust laser beams from the scanner 102, which are directed to the target device 114, and improve performance of the target device 114 as a detector of laser beams from the scanner 102.

The light shaping diffuser 820 operates to spread out laser beams to be better detected by the target device 114. In some embodiments, the light shaping diffuser 820 is used to expand a light beam to increase the number of photodiode devices 840 that receive the light beam (i.e., increase the total size of light active areas 844 along the longitudinal axis L), thereby reducing the effect of the blind areas 860 between the photodiode devices 840 that receive the light beam onto the optical detector 608. As such, the light shaping diffuser 820 operates to magnify and/or redirect laser beams onto the optical detector 608 of the target device 114.

In some embodiments, the light shaping diffuser 820 is configured to receive a light beam 906 (which can have a circular cross section) and provide a fan shape light pattern 908. The fan shape light pattern 908 has a larger length in a direction along the array of the optical detector 608 than in another direction, such that the light beam passing through the light shaping diffuser 820 reaches more photodiode devices 840. For example, the fan shape light pattern 908 is oval or egg-shaped. In the illustrated example, the fan shape pattern 908 generated by the light shaping diffuser 820 has a larger diameter or width Dv along the longitudinal axis L (or in a vertical direction) than a diameter or width Dh along an axis (or in a horizontal direction) transverse to the longitudinal axis L. The fan shape pattern 908 can decrease effect of the blind areas and increase resolution of the target device. In some embodiments, an angle ANGv at which a light beam 906 diffuses to the fan shape pattern 908 along the longitudinal axis L ranges from 30 to 150 degrees, and an angle ANGh at which the light beam 906 diffuses along the horizontal direction ranges from 5 to 30 degrees. In other embodiments, the angle ANGv ranges from 40 to 80 degrees, and the angle ANGh ranges from 8 to 20 degrees. In yet other embodiments, the angle ANGv is about 60 degrees, and the angle ANGh is about 10 degrees. In some embodiments, the angles ANGv and ANGh are determined in full width at half maximum (FWHM).

In some embodiments, the light shaping diffuser 820 in accordance with the present disclosure can improve accuracy of the target device 114 with, for example, about ±1.5 mm of accuracy, when laser beams are generated from the scanner 102 apart from the target device 114 by about 2-3 meters. In comparison, the target device 114 without the light shaping diffuser 820 has about ±3.5 mm or greater of accuracy with the same laser beams from the scanner 102.

The light shaping diffuser 820 is arranged in front of the optical detector 608 of the circuit board 802 with or without a target mask 830 (FIGS. 24-31). In particular, the light shaping diffuser 820 is disposed at a distance D10 (FIG. 15) from the circuit board 802 or the optical detector 608 (e.g., the photodiode devices 840). In some embodiments, the distance D10 is defined as a distance between the back surface of the light shaping diffuser 820 and the front surface of the optical detector 608 (e.g., the front surface of the photodiode devices 840). In some embodiments, the distance D10 ranges from about 3 to about 20 mm. In other embodiments, the distance D10 ranges from about 5 to about 10 mm. In yet other embodiments, the distance D10 is around 6.42 mm (about 0.253 inches). In some embodiments, the light shaping diffuser 820 is disposed within the target device 114 (as schematically illustrated in FIG. 15) or mounted on the exterior surface of the target device 114. In other embodiments, the light shaping diffuser 820 is arranged separately from the target device 114 between the scanner 102 and the target device 114.

The light shaping diffuser 820 has a thickness D11, which, in some embodiments, ranges from about 0.005 to about 0.5 inches. In other embodiments, the thickness D11 ranges from about 0.007 to about 0.1 inches. In yet other embodiments, the thickness D11 is about 0.010 inches.

In some embodiments, an ambient light filter is used with the laser 336. In some embodiments, such an ambient light filter is arranged before the light shaping diffuser 820 opposite to the optical detector 608. In other embodiments, as illustrated in FIG. 15, the ambient light filter 822 is arranged behind the light shaping diffuser 820 on the same side as the optical detector 608. This arrangement of the ambient light filter 822 can provide additional height to diffuse light vertically. Where the laser 336 is a green laser beam generator, the ambient light filter is a green ambient light filter.

Referring to FIGS. 24-31, another exemplary embodiment of the light control device 116. In this example, the light control device 116 includes a target mask 830, as also illustrated in FIG. 15. As described herein, the light control device 116 operates to modify laser beams from the scanner 102, which are directed to the target device 114, and improve performance of the target device 114 as a detector of laser beams from the scanner 102.

Figure 24:
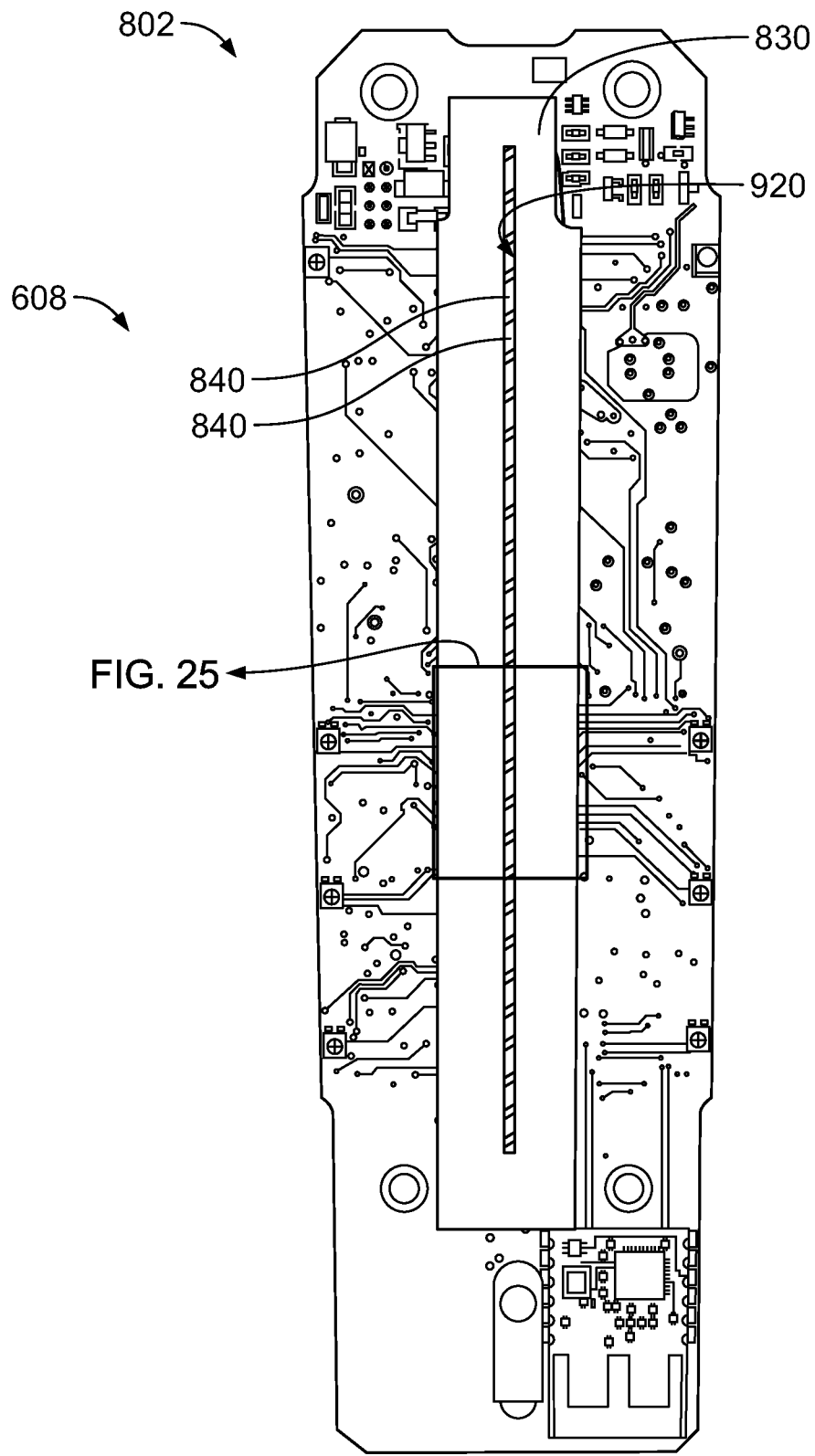
FIG. 24 is a front view of a target mask in accordance with an exemplary embodiment of the present disclosure.
Figure 25:
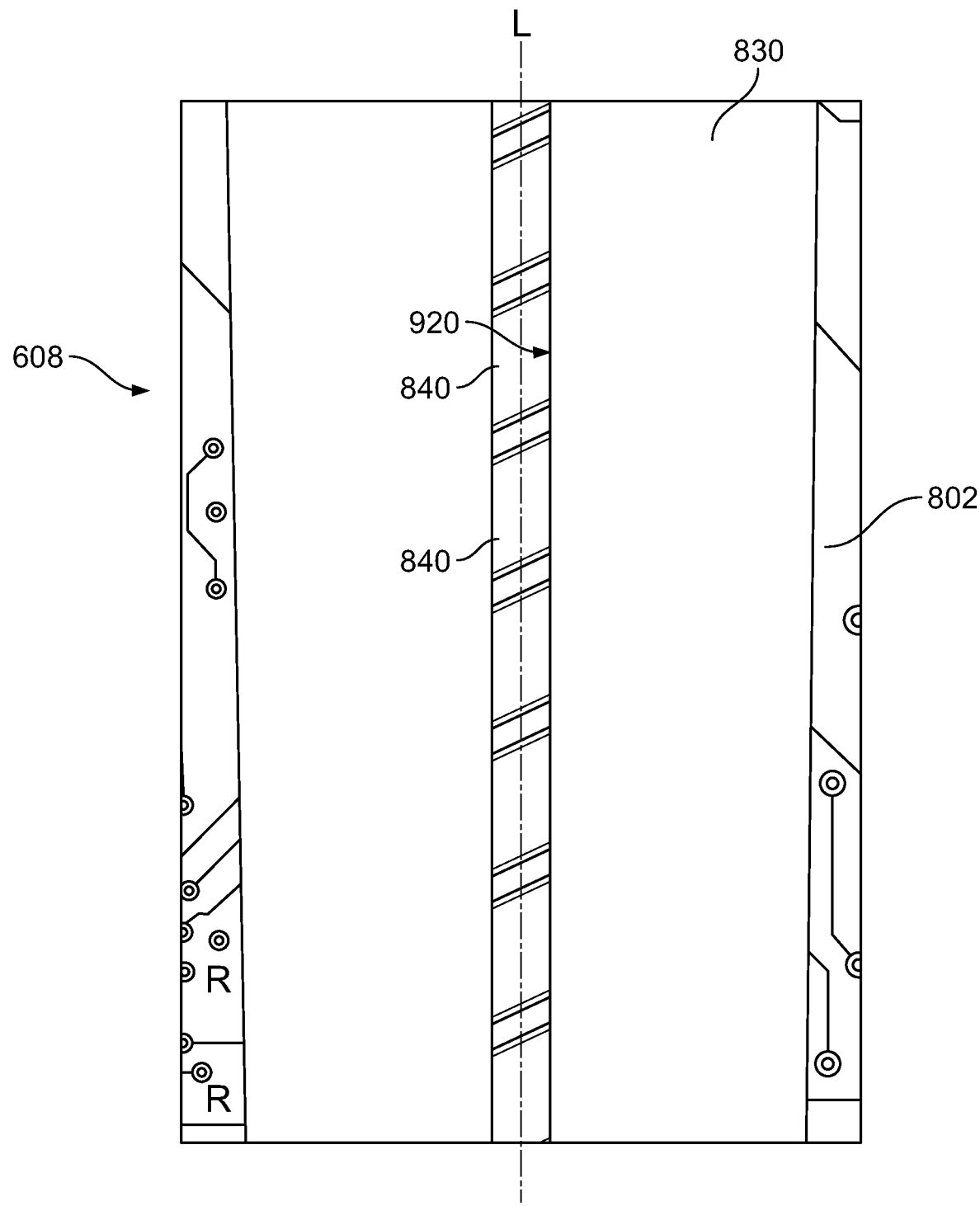
FIG. 25 is an expanded view of the target mask of FIG. 24.

FIGS. 24 and 25 illustrate an example of the target mask 830 mounted to the circuit board 802, which is illustrated in FIG. 17. In particular, FIG. 24 is a front view of an example target mask 830 mounted on the circuit board 802, and FIG. 25 is an expanded view of the target mask 830 of FIG. 24.

The target mask 830 operates to pass a portion of light beam directed to the target device 114 to provide a uniform light signal onto the optical detector 608, thereby improving accuracy in detection of light through the target device 114.

The target mask 830 includes a slot 920 that permits a portion of light beam passes onto the optical detector 608 therethrough, and prevents the remaining of the light beam from reaching the optical detector 608. In some embodiments, the slot 920 extends along the longitudinal axis L so that a middle portion of the photodiode devices 840 are exposed through the slot 920 when the target mask 830 is mounted onto the photodiode devices 840.

In the illustrated example, the target mask 830 is used with the angled arrangement of photodiode devices 840 as illustrated in FIG. 22. In other embodiments, however, the target mask 830 is used with the non-angled arrangement of photodiode devices 840 as illustrated in FIG. 21. The target mask 830 can be used together with the light shaping diffuser 820, which generates a fan shape pattern. The target mask 830 can also be used with other types of light shaping diffusers, such as a diffuser generating a cone-shape pattern.

Figure 26:
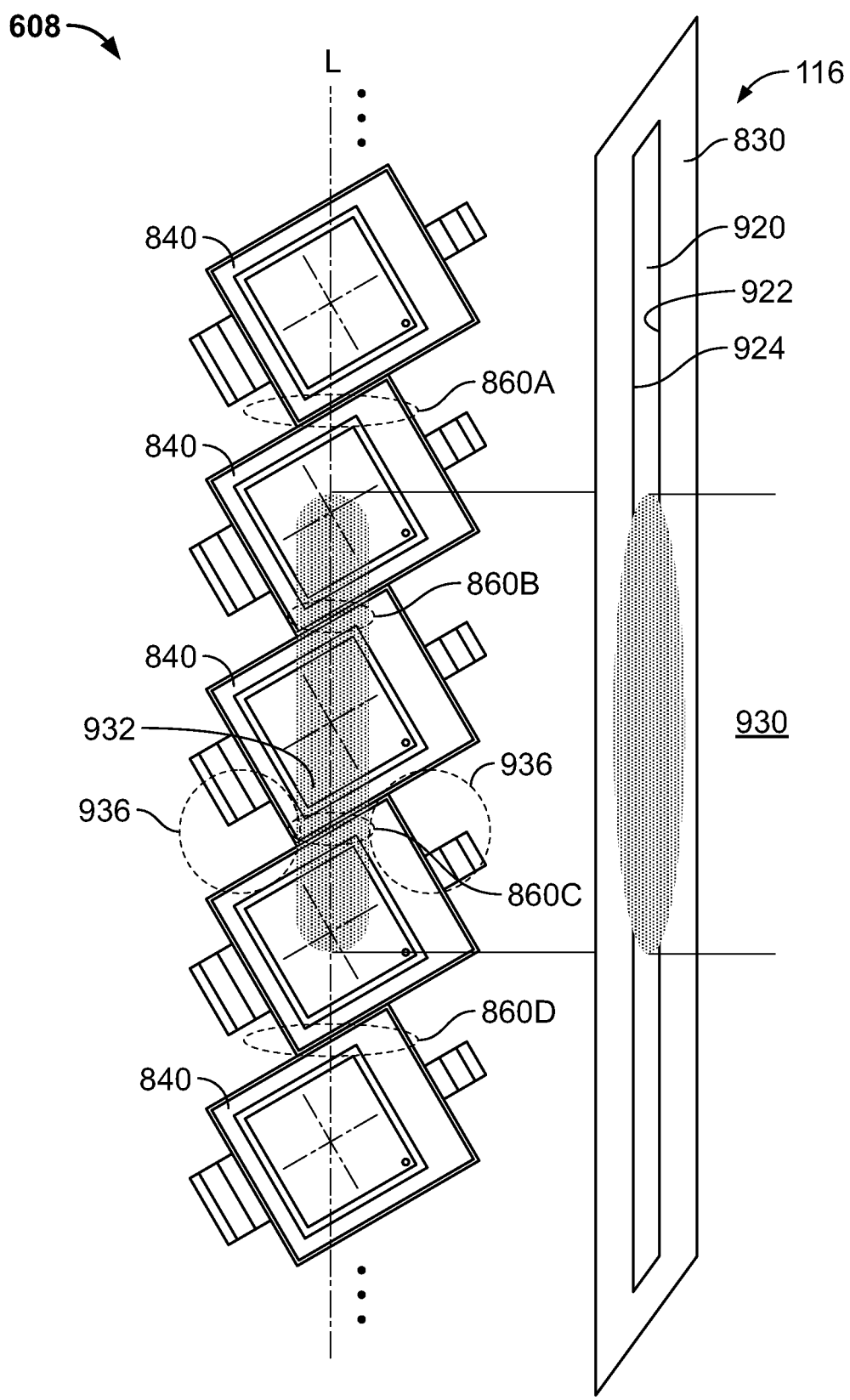
FIG. 26 schematically illustrates an example operation of the target mask of FIG. 24.

FIG. 26 schematically illustrates an example operation of the target mask 830. In this example, the target mask 830 has opposing straight edges 922 and 924 along the longitudinal axis L to define the slot 920. The slot 920 is arranged over the array of photodiode devices 840 to restrict a sensing region of the optical detector 608 to the slot 920. As such, the slot 920 of the target mask 830 provides a uniform signal when laser beam crosses over the target device 114. As illustrated in FIG. 26, a light beam 930 directed onto the target mask 830 is shaped by the slot 920 of the target mask 830, and a strip of light beam 932 reaches the array of photodiode devices 840. Since the uniform strip of light beam 932 is arranged in the middle of the array of photodiode devices 840, a size of the blind areas 860 (e.g., the size of the second and third blind areas 860B and 860C as depicted in FIG. 26) that receives the strip of light beam 932 is smaller than a size of the blind areas 860 (e.g., the size of the second and third blind areas 860B and 860C as depicted in FIG. 22 or 23) that would have received a light beam 930 without the target mask 830. Therefore, the target mask 830 effectively reduces the blind areas 860, thereby improving accuracy in determining a position of the light beam on the target device 114. Further, the target mask 830 can prevent a portion of the light beam 930 from reaching other possible blind areas 936 between angled photodiode devices 840.

Figure 27:
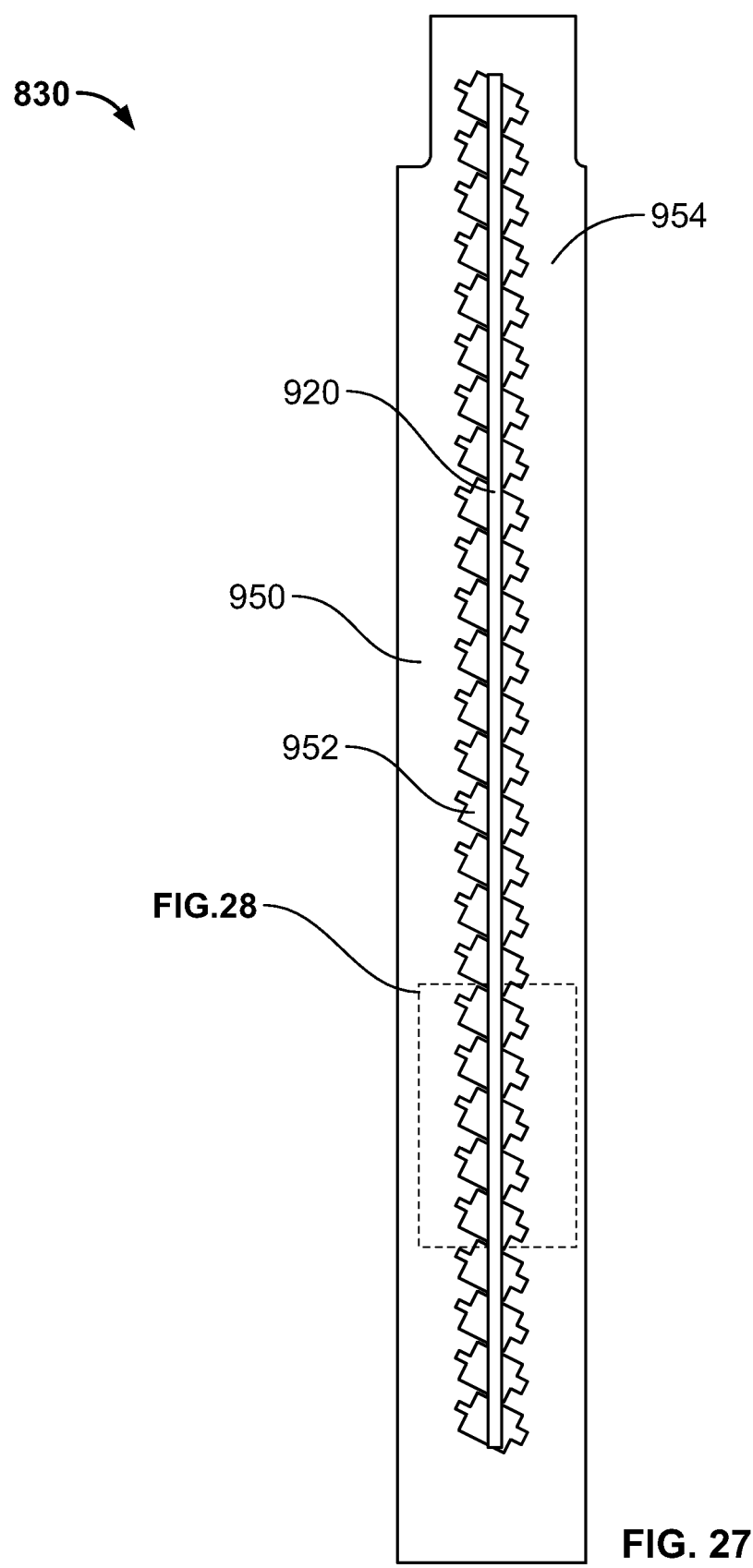
FIG. 27 is a schematic rear view of the target mask of FIG. 24.
Figure 28:
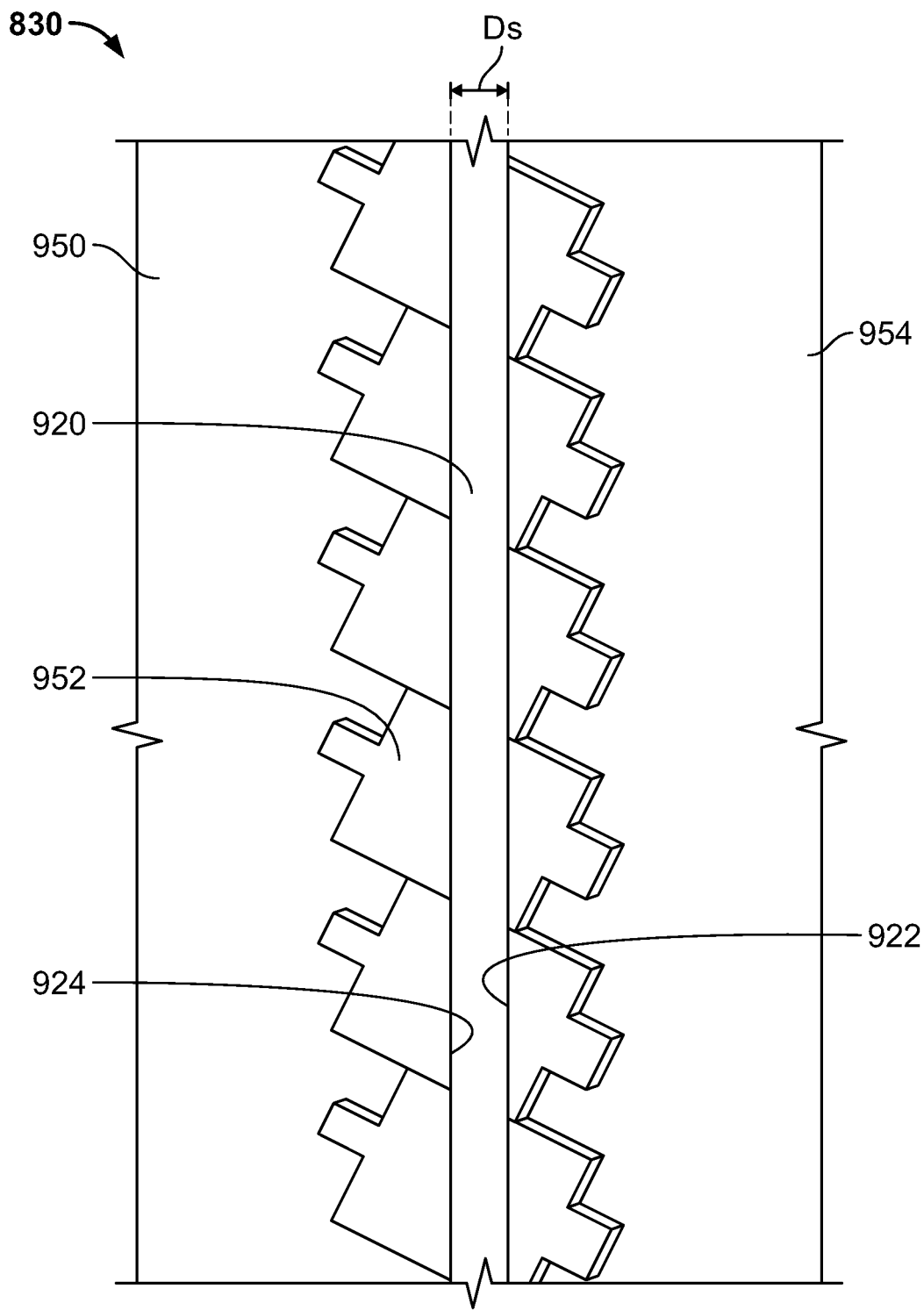
FIG. 28 is an expanded view of the target masktarget mask of FIG. 27.

Referring to FIGS. 27 and 28, which are schematic rear view and expanded view of the target mask 830, the target mask 830 has a rear side 950 that is arranged to face the optical detector 608 when the target mask 830 is mounted to the circuit board 802. In some embodiments, the target mask 830 is disposed on the optical detector 608 so as to contact with the optical detector 608. In other embodiments, the target mask 830 is arranged apart from the optical detector 608.

In some embodiments, the target mask 830 includes a recessed portion 952 engraved on the rear side 950 of the target mask 830. The recessed portion 952 is configured to receive at least portion of the optical detector 608 when the target mask 830 is mounted thereto. As illustrated, some embodiments of the recessed portion 952 have a contour that corresponds to the array of photodiode devices 840 such that the photodiode devices 840 at least partially complementarily fit into the recessed portion 952.

The target mask 830 is mounted onto the optical detector 608 in various manners. In some embodiments, the target mask 830 is glued onto the photodiode devices 840. For example, adhesive (e.g., hot-melt adhesive or silicon adhesive) is applied on the recessed portion 952 and the target mask 830 is pushed down on the photodiode devices 840 so as to receive the photodiode devices 840 in place. In other embodiments, the target mask 830 can be fastened to the circuit board 802 or other parts of the target device 114. In yet other embodiments, the target mask 830 is configured to snap in the circuit board 802 or other parts of the target device 114.

The target mask 830 has an opaque body 954 that prevents light from passing therethrough, and thus the light only can pass through the slot 920. In the illustrated example, the target mask 830 is made from a plate (e.g., a plastic or metal plate). In other embodiments, the target mask 830 is formed on the optical detector 608 (i.e., the photodiode devices 840) using two strips of opaque tapes that are arranged over, or attached on, the photodiode devices 840 in parallel so that a gap is formed between the tapes to provide the same effect as the slot 920 of the target mask 830. Other configurations are also possible to operate similarly to the slot 920 of the target mask 830.

The slot 920 has a width Ds between the opposing edges 922 and 924. The width Ds of the slot 920 is adjusted based on various factors, including configurations and relative arrangements of associated components, such as the target device 114, the scanner 102, and components of the target device 114 and/or the scanner 102. In some embodiments, the width Ds ranges from about 0.5 to about 3 mm. In other embodiments, the width Ds ranges from about 1 to 2 mm. In yet other embodiments, the width Ds is about 1.25 mm.

In some embodiments, the target mask 830 in accordance with the present disclosure can improve accuracy of the target device 114. For example, the target mask 830 can attain about ±0.5 mm of accuracy in measurement by the target device 114, when laser beams are generated from the scanner 102 apart from the target device 114 by about 2-3 meters. In comparison, the target device 114 without the target mask 830 has about ±3.5 mm or greater of accuracy with the same laser beams from the scanner 102.

Figure 29:
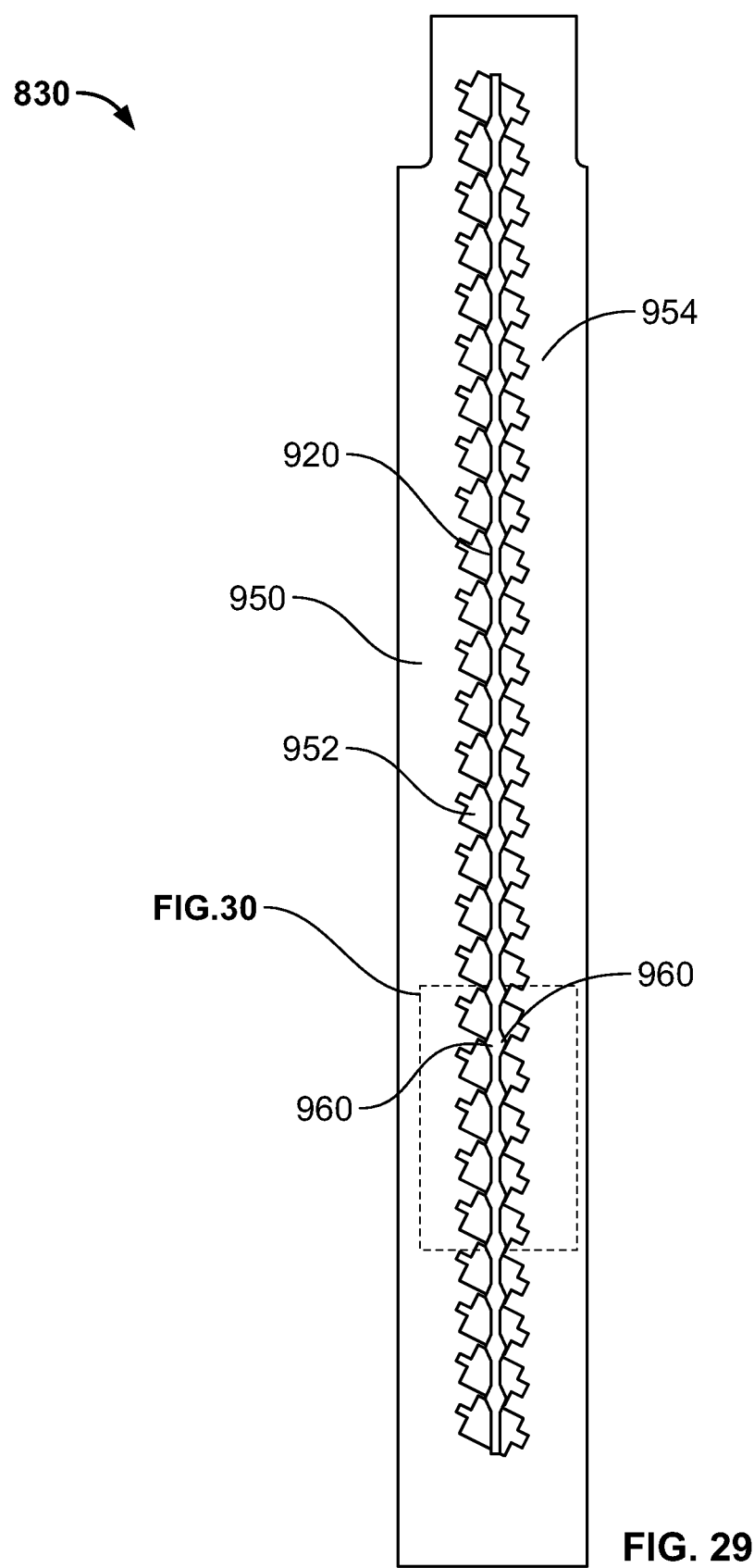
FIG. 29 is a schematic rear view of a target mask in accordance with another exemplary embodiment of the present disclosure.
Figure 30:
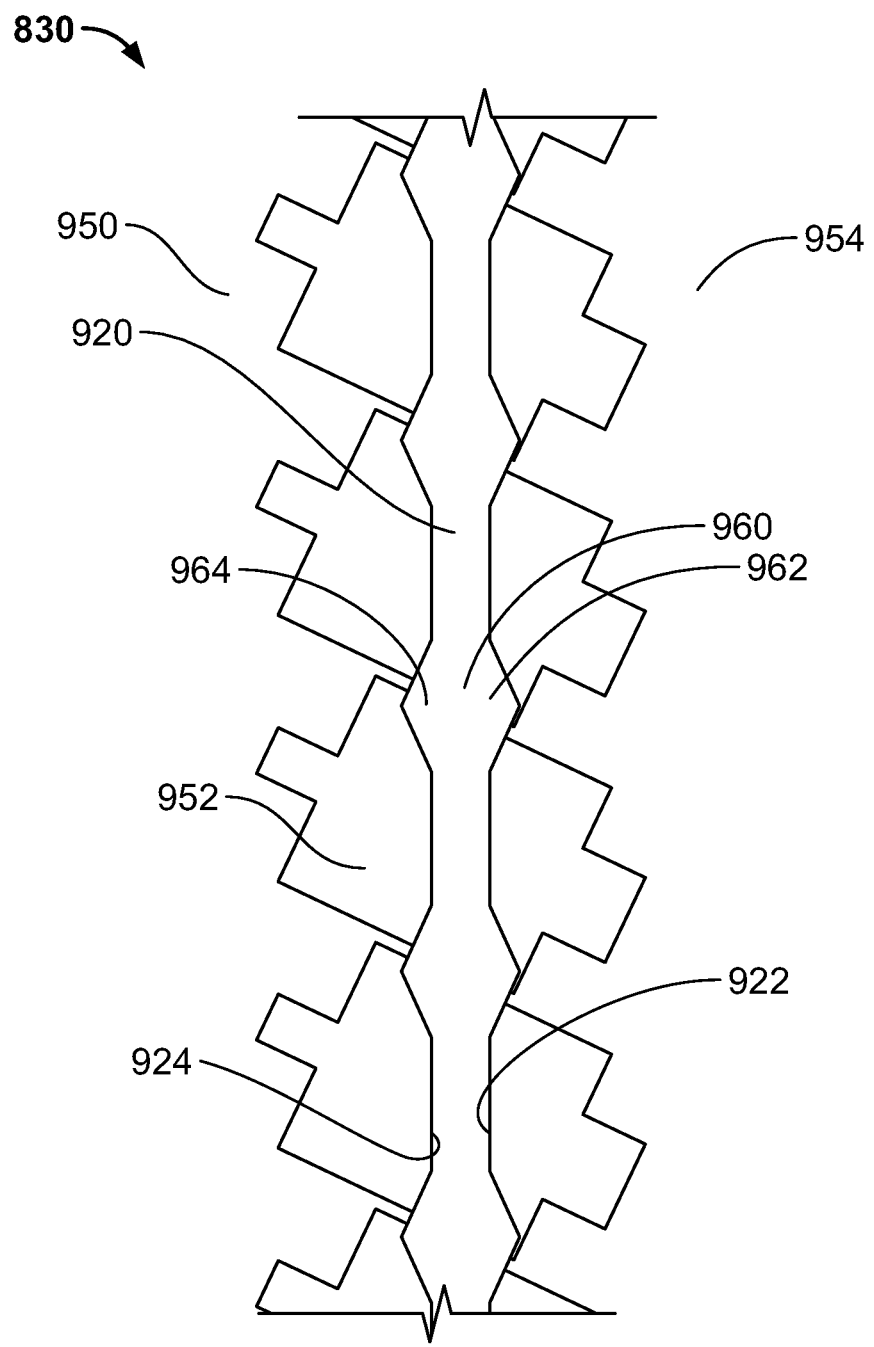
FIG. 30 is an expanded view of the target mask of FIG. 29.

Referring to FIGS. 29-30, another exemplary embodiment of the target mask 830 is described. In particular, FIG. 29 is a schematic rear view of the target mask 830, and FIG. 30 is an expanded view of the target mask of FIG. 29.

The target mask 830 in this example is similar to the target mask 830 as illustrated in FIGS. 23-28. Therefore, the description of the target mask with reference to FIGS. 23-28 is incorporated by reference for this example. Where like or similar features or elements are shown, the same reference numbers will be used where possible. The following description is limited primarily to the differences from the target mask of FIGS. 23-28.

Figure 31:
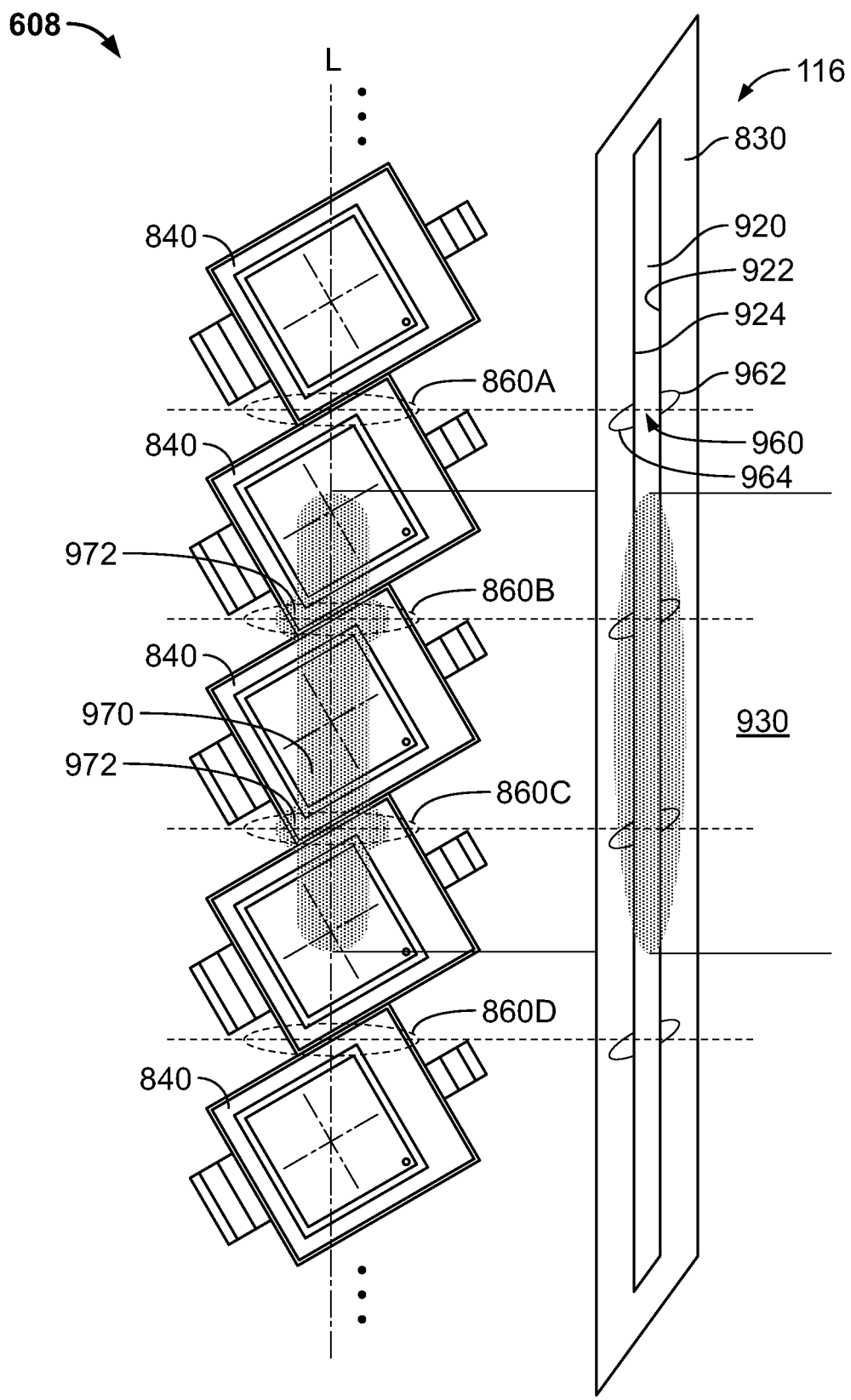
FIG. 31 schematically illustrates an example operation of the target mask of FIG. 29.

In the illustrated example of FIGS. 29-31, the target mask 830 further includes a plurality of extended openings 960, which are also referred to herein as enlarged openings. The extended openings 960 are configured to permit an increased amount of light to pass therethrough and be projected onto spaces (e.g., the blind areas 860) between the plurality of photodiode devices 840. The extended openings 960 are arranged along the slot 920 of the target mask 830 and configured to be disposed over the blind areas 860 between the photodiode devices 840 when the target mask 830 is mounted thereon. As further illustrated in FIG. 30, the extended openings 960 can allow for additional sensing near the blind areas 860 and thus help offset loss of signal when laser beam crosses over the photodiode devices 840.

In some embodiments, the extended openings 960 are defined by opposing indented portions 962 and 964 formed at the opposing edges 922 and 924 of the slot 920. The indented portions 962 and 964 can have various profiles.

FIG. 31 schematically illustrates an example operation of the target mask 830 of FIG. 29. Similarly to the target mask 830 of FIG. 26, the target mask 830 in this example has the slot 920 arranged over the array of photodiode devices 840 to restrict a sensing region of the optical detector 608 to the slot 920. As such, the slot 920 of the target mask 830 provides a uniform signal when laser beam crosses over the target device 114. In addition, the target mask 830 includes the extended openings 960 that are configured to align with the blind areas 860. As illustrated, a light beam 930 directed onto the target mask 830 is shaped by the slot 920 and the extended openings 960, and thus a strip of light beam 970 is formed on the array of photodiode devices 840. The strip of light beam 970 has extended light portions 972 that correspond to the extended openings 960 and reach the blind areas 860. As such, the target mask 830 with the extended openings 960 allows additional sensing capability to the photodiode devices 840 near the blind areas 860 (e.g., 860B and 860C in FIG. 31), thereby helping offset loss of signal when the target device 114 receives laser beam.

In some embodiments, the target mask 830 in accordance with this example of the present disclosure can improve accuracy of the target device 114 with, for example, about ±0.35 mm of accuracy, when laser beams are generated from the scanner 102 apart from the target device 114 by about 2-3 meters. In comparison, the target device 114 without the target mask 830 has about ±3.5 mm or greater of accuracy with the same laser beams from the scanner 102.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A laser measurement system comprising:
    a scanner device configured to generate a laser beam; and
    a target device including:
        an optical detector configured to detect when the laser beam is directed at the target device and a position of the laser beam relative to the optical detector, wherein the optical detector includes a plurality of photodiode devices oriented at a predetermined angle relative to a first direction along which the plurality of photodiode devices are arranged and spaced apart; and
        a light control device configured to shape the laser beam directed to the optical detector of the target device.

2. The laser measurement system of claim 1, wherein each of the photodiode devices including a frame and a light detection area in the frame, the light detection area of one of the photodiode devices being spaced apart from a light detection area of another photodiode device adjacent to the one of the photodiode devices.

3. The laser measurement system of claim 1, wherein the light control device includes a light shaping diffuser configured to diffuse the laser beam into a fan shape pattern projected onto the optical detector.

4. The laser measurement system of claim 1, wherein the light control device includes a target mask configured to permit a portion of the laser beam to pass therethrough and be projected onto the optical detector.

5. The laser measurement system of claim 1, wherein the light control device includes a target mask arranged over the plurality of photodiode devices and including a longitudinal slot configured to permit a portion of the laser beam to pass therethrough and be projected onto at least a portion of the plurality of photodiode devices.

6. The laser measurement system of claim 1, wherein the light control device includes a target mask arranged over the plurality of photodiode devices and including a longitudinal slot configured to permit a portion of the laser beam to pass therethrough and be projected onto at least a portion of the plurality of photodiode devices, the longitudinal slot including at least one extended opening configured to permit a portion of the laser beam to pass therethrough and be projected onto an area between the plurality of photodiode devices.

7. The laser measurement system of claim 6, wherein the target mask includes indented portions formed at opposing edges of the longitudinal slot, the indented portions defining the extended opening.

8. The laser measurement system of claim 1, further comprising:
a frame attachment device configured to connect to a frame of a vehicle; and
a stem configured to support the target device in a spaced relationship to the frame attachment device.

9. A target device of a laser measurement system, the target device comprising:
a housing; and
electrical circuitry protected by the housing, the electrical circuitry including:
an optical detector that detects when a laser beam is directed at the target device and detects positions of the laser beam relative to the optical detector, wherein the optical detector includes a plurality of photodiode devices oriented at a predetermined angle relative to a first direction along which the plurality of photodiode devices are arranged and spaced apart; and
a light control device arranged over the optical detector and configured to shape the laser beam directed to the optical detector.

10. The target device of claim 9, wherein each of the photodiode devices including a frame and a light detection area in the frame, the light detection area of one of the photodiode devices being spaced apart from a light detection area of another photodiode device adjacent to the one of the photodiode devices.

11. The target device of claim 9, wherein the light control device includes a light shaping diffuser configured to diffuse the laser beam into a fan shape pattern projected onto the optical detector.

12. The target device of claim 9, wherein the light control device includes a target mask configured to permit a portion of the laser beam to pass therethrough and be projected onto the optical detector.

13. The target device of claim 9, wherein the light control device includes a target mask arranged over the plurality of photodiode devices and including a longitudinal slot configured to permit a portion of the laser beam to pass therethrough and be projected onto at least a portion of the plurality of photodiode devices.

14. The target device of claim 9, wherein the light control device includes a target mask arranged over the plurality of photodiode devices and including a longitudinal slot configured to permit a portion of the laser beam to pass therethrough and be projected onto at least a portion of the plurality of photodiode devices, the longitudinal slot including at least one extended opening configured to permit a portion of the laser beam to pass therethrough and be projected onto an area between the plurality of photodiode devices.

15. The target device of claim 14, wherein the target mask includes indented portions formed at opposing edges of the longitudinal slot, the indented portions defining the extended opening.

16. The target device of claim 9, further comprising:
a frame attachment device configured to connect to a frame of a vehicle; and
a stem configured to support the target device in a spaced relationship to the frame attachment device.

17. The laser measurement system of claim 6, wherein the light control device further includes a light shaping diffuser arranged between the scanner device and the target mask, the light shaping diffuser configured to diffuse the laser beam into a pattern before the portion of the laser beam is permitted to pass through the longitudinal slot of the target mask and be projected onto at least a portion of the plurality of photodiode devices.

18. The target device of claim 14, wherein the light control device further includes a light shaping diffuser arranged between a device directing the laser beam at the target device and the target mask, the light shaping diffuser configured to diffuse the laser beam into a pattern before the portion of the laser beam is permitted to pass through the longitudinal slot of the target mask and be projected onto at least a portion of the plurality of photodiode devices.

19. A target device of a laser measurement system, the target device comprising:
an optical detector configured to detect when a laser beam is directed at the target device and a position of the laser beam relative to the optical detector, wherein the optical detector includes a plurality of photodiode devices oriented at a predetermined angle relative to a first direction along which the plurality of photodiode devices are arranged and spaced apart; and
a light control device including:
a target mask arranged over the plurality of photodiode devices and including a longitudinal slot configured to permit a portion of the laser beam to pass therethrough and be projected onto at least a portion of the plurality of photodiode devices, the longitudinal slot including at least one extended opening configured to permit a portion of the laser beam to pass therethrough and be projected onto an area between the plurality of photodiode devices; and
a light shaping diffuser arranged between a device directing the laser beam at the target device and the target mask, the light shaping diffuser configured to diffuse the laser beam into a pattern before the portion of the laser beam is permitted to pass through the longitudinal slot of the target mask and be projected onto at least a portion of the plurality of photodiode devices.

* * * * *